(12) United States Patent
Collier et al.

(10) Patent No.: US 10,364,387 B2
(45) Date of Patent: Jul. 30, 2019

(54) SUBTERRANEAN FORMATION SHOCK FRACTURING CHARGE DELIVERY SYSTEM

(71) Applicant: Innovative Defense, LLC, Smithville, TX (US)

(72) Inventors: Nicholas Collier, Smithville, TX (US); David Shawn Flatt, Forney, TX (US)

(73) Assignee: Innovative Defense, LLC, Smithville, TX (US)

( * ) Notice: Subject to any disclaimer, the term of this patent is extended or adjusted under 35 U.S.C. 154(b) by 0 days.

(21) Appl. No.: 15/663,459

(22) Filed: Jul. 28, 2017

(65) Prior Publication Data

US 2018/0030334 A1 Feb. 1, 2018

Related U.S. Application Data

(60) Provisional application No. 62/368,800, filed on Jul. 29, 2016.

(51) Int. Cl.
*C09K 8/00* (2006.01)
*C09K 8/62* (2006.01)
(Continued)

(52) U.S. Cl.
CPC ............. *C09K 8/62* (2013.01); *C09K 8/70* (2013.01); *C09K 8/80* (2013.01); *E21B 43/117* (2013.01);
(Continued)

(58) Field of Classification Search
CPC ... C09K 8/00; C09K 8/62; C09K 8/70; C09K 8/80; E21B 43/00; E21B 43/117;
(Continued)

(56) References Cited

U.S. PATENT DOCUMENTS 2,696,169 A * 12/1954 Lassiter, Jr. ........... E21B 43/117
175/4.53
2,757,611 A 8/1956 Church et al.
(Continued)

FOREIGN PATENT DOCUMENTS

GB 2246621 5/1992

*Primary Examiner* — James G Sayre
(74) *Attorney, Agent, or Firm* — Hemingway & Hansen, LLP; D. Scott Hemingway

(57) ABSTRACT

This invention is a subterranean (non-hydraulic) shock fracturing system and process for fracturing oil and gas bearing formations. The system delivers small amounts of precisely placed explosive charges into the formation. These charges produce large diameter deep penetrations and by coupling to the rock concussively fracture the formation in the vicinity increasing permeability in the rock or strata. Shock fracturing (SF) is far more efficient than hydraulic fracturing (HF), SF fractures radially across all strata and leaves no part of the volume addressed un-permeated. The objective of the system is to efficiently increase permeability of the formation by directionally controlled concussive shattering of the rock around the epicenter of the detonation of the explosive charge deposited in the formation. This invention makes possible the delivery of measured quantities of explosive deep into a subterranean oil or gas bearing formation and detonate said explosive in order to fracture the formation in the local vicinity.

45 Claims, 18 Drawing Sheets

(51) Int. Cl.
*C09K 8/70* (2006.01)
*C09K 8/80* (2006.01)
*F42B 1/02* (2006.01)
*F42B 3/02* (2006.01)
*E21B 43/00* (2006.01)
*E21B 43/26* (2006.01)
*F42B 1/028* (2006.01)
*E21B 43/117* (2006.01)
*E21B 43/119* (2006.01)

(52) U.S. Cl.
CPC ............ *E21B 43/119* (2013.01); *E21B 43/26* (2013.01); *F42B 1/02* (2013.01); *F42B 1/028* (2013.01); *F42B 3/02* (2013.01); *C09K 8/00* (2013.01); *E21B 43/00* (2013.01)

(58) Field of Classification Search
CPC .......... E21B 43/119; E21B 43/26; F42B 1/02; F42B 1/028; F42B 3/02
See application file for complete search history.

(56) References Cited

U.S. PATENT DOCUMENTS

| | | | |
|---|---|---|---|
| 2,796,833 A | 6/1957 | Sweetman | |
| 2,804,823 A | 9/1957 | Jablansky | |
| 2,873,676 A * | 2/1959 | Caldwell | E21B 43/117 102/310 |
| 2,947,251 A * | 8/1960 | Jilly | E21B 43/117 166/55 |
| 3,221,655 A * | 12/1965 | Venghiattis | E21B 43/117 175/4.55 |
| 3,302,567 A | 2/1967 | Venghiattis | |
| 3,329,219 A * | 7/1967 | Pausky | E21B 43/117 102/310 |
| 3,561,361 A | 2/1971 | Kessenich et al. | |
| 3,721,192 A | 3/1973 | McEwan et al. | |
| 3,762,473 A * | 10/1973 | Wolk | E21B 23/00 166/241.5 |
| 3,838,644 A | 10/1974 | Prochnow et al. | |
| 3,903,803 A | 9/1975 | Losey | |
| 3,908,933 A | 9/1975 | Goss et al. | |
| 4,078,611 A * | 3/1978 | Vann | E21B 43/119 166/297 |
| 4,300,453 A | 11/1981 | Bigler | |
| 4,313,380 A | 2/1982 | Martner et al. | |
| 4,342,262 A | 8/1982 | Romer et al. | |
| 4,430,939 A | 2/1984 | Harrold | |
| 4,441,428 A | 4/1984 | Wilson | |
| 4,450,768 A | 5/1984 | Bell | |
| 4,425,850 A | 6/1984 | Grossler | |
| 4,551,287 A | 11/1985 | Bethmann | |
| 4,632,036 A | 12/1986 | Ringel | |
| 4,643,097 A | 2/1987 | Chawla et al. | |
| 4,665,826 A | 5/1987 | Marer | |
| 4,669,386 A | 6/1987 | Precoul et al. | |
| 4,672,896 A | 6/1987 | Precoul et al. | |
| 4,688,486 A | 8/1987 | Hall et al. | |
| 4,759,886 A | 7/1988 | Daugherity | |
| 4,833,994 A | 5/1989 | Strobush | |
| 4,841,864 A | 6/1989 | Grace | |
| 4,896,609 A | 1/1990 | Betts et al. | |
| 4,982,665 A | 1/1991 | Sewell et al. | |
| 4,989,517 A | 2/1991 | Adimari et al. | |
| 5,003,884 A | 4/1991 | Nissl et al. | |
| 5,078,069 A | 1/1992 | August et al. | |
| 5,088,416 A | 2/1992 | Sabranski | |
| 5,235,128 A | 8/1993 | Hardesty et al. | |
| 5,245,927 A | 9/1993 | Ranes | |
| 5,251,561 A | 10/1993 | Murphy | |
| 5,269,223 A | 12/1993 | Mattsson et al. | |
| 5,318,123 A * | 6/1994 | Venditto | E21B 43/26 166/250.1 |
| 5,320,044 A | 6/1994 | Walters | |
| 5,621,185 A | 4/1997 | Spengler et al. | |
| 5,753,850 A | 5/1998 | Chawla et al. | |
| 5,847,312 A | 12/1998 | Walters et al. | |
| 5,988,071 A | 11/1999 | Taylor | |
| 6,179,944 B1 | 1/2001 | Monolo et al. | |
| 6,354,219 B1 | 3/2002 | Pratt et al. | |
| 6,443,068 B1 | 9/2002 | Meister | |
| 6,477,959 B1 | 11/2002 | Ritman et al. | |
| 6,644,205 B2 | 11/2003 | Ritman et al. | |
| 6,668,726 B2 | 12/2003 | Lussier | |
| 6,758,143 B2 | 7/2004 | Ritman et al. | |
| 6,792,866 B2 | 9/2004 | Grattan | |
| 6,840,178 B2 | 1/2005 | Collins et al. | |
| 7,261,036 B2 | 8/2007 | Bourne et al. | |
| 7,621,221 B2 | 11/2009 | Ritman | |
| 7,753,850 B2 | 7/2010 | Averkiou et al. | |
| 7,779,760 B2 | 8/2010 | Konig | |
| 7,810,431 B2 | 10/2010 | Heine et al. | |
| 7,819,064 B2 | 10/2010 | Saenger et al. | |
| 8,375,859 B2 | 2/2013 | Sagebiel | |
| 9,360,222 B1 | 6/2016 | Collier | |
| 9,612,094 B1 | 4/2017 | Collier | |
| 2003/0183113 A1 | 10/2003 | Barlow et al. | |
| 2005/0188878 A1 | 9/2005 | Baker et al. | |
| 2005/0194181 A1* | 9/2005 | Barker | E21B 43/117 175/4.55 |
| 2006/0107862 A1 | 5/2006 | Davis et al. | |
| 2008/0011179 A1 | 1/2008 | Michel et al. | |
| 2008/0134925 A1 | 6/2008 | Konig | |
| 2008/0289529 A1 | 11/2008 | Schilling | |
| 2009/0211481 A1 | 8/2009 | Schwantes et al. | |
| 2010/0018427 A1* | 1/2010 | Roland | F41H 11/11 102/305 |
| 2011/0017453 A1* | 1/2011 | Mytopher | E21B 43/117 166/298 |
| 2011/0232519 A1* | 9/2011 | Sagebiel | F42B 1/028 102/309 |
| 2013/0019770 A1* | 1/2013 | Walker | E21B 43/117 102/322 |
| 2013/0199394 A1 | 8/2013 | Collier | |

\* cited by examiner

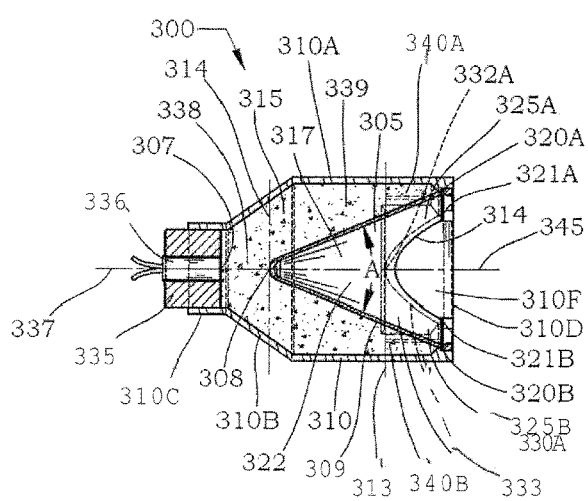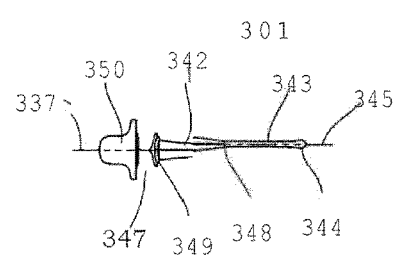
FIG. 7
FIG. 8

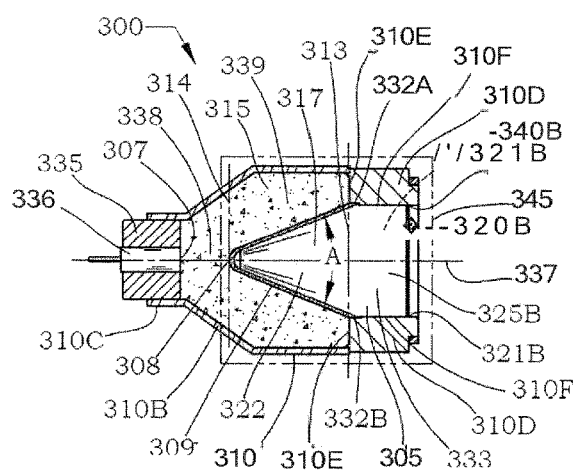
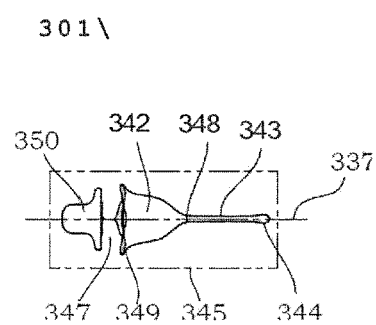
FIG. 9
FIG. 10

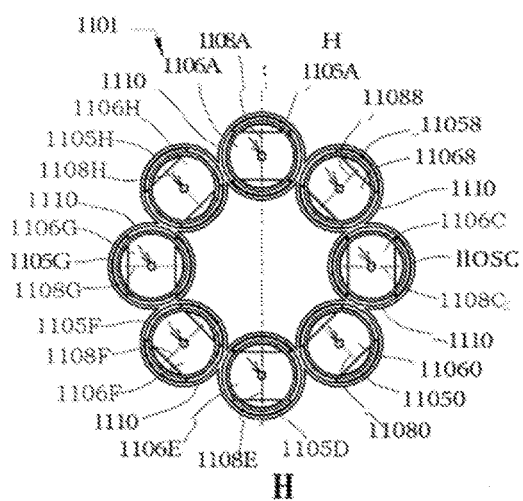
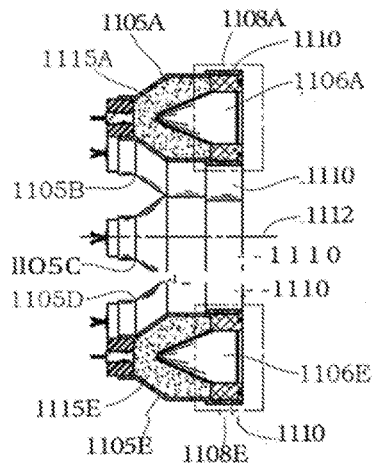
FIG. 21
FIG. 22

SUBTERRANEAN FORMATION SHOCK FRACTURING CHARGE DELIVERY SYSTEM

RELATED APPLICATION DATA

This application is related to Provisional Application Ser. No. 62/368,800 filed on Jul. 29, 2016, and priority is claimed for this earlier filing under U.S.C. § 119(e). The Provisional Patent Application is also incorporated by reference into this application.

TECHNICAL FIELD OF INVENTION

The technical field of the present invention relates to using shaped charge devices in the recovery of subsurface minerals and substances, which directly relates to the development of energy resources.

BACKGROUND OF INVENTION

As Donald R. Kennedy described in "The History of Shaped Charges," the concept of shaping an explosive charge to focus its energy was known as far back as 1792. In 1884, Max von Forester conducted experiments in Germany showing that an explosive charge with a hollow cavity will focus the explosive energy and produce a collimated jet of high speed gasses along the longitudinal axis of the cavity. When this cavity is lined with a ductile metal, it will produce a high speed collimated stretching jet of liquefied material capable of penetrating all known materials.

In 1888, Charles Munroe was conducting research for the U.S Navy at Newport, R.I., and he discovered that explosive energy could be focused in this manner and lining the hollow cavity in the explosive with metal increased the penetration dramatically. This effect is now commonly referred to as the "Munroe Effect."

These discoveries were further studied in 1910 by Egon Neumann of Germany when he conducted similar experiments, and his experiments showed that a cylinder of explosive material with a metal lined hollow cavity could result in a shape charge jet stream that can penetrate steel plates. The military implications of this phenomenon were not realized until just prior to, and after, World War II.

In the 1930's, flash x-ray technology was developed that allowed the in-depth study of shaped charge jetting process. With this new diagnostic, it was possible to take X-Ray pictures of the collapse of the liner and the resulting jet. This new diagnostic tool led to a more scientific and complete understanding of the Munroe principle, and improved the techniques and power achieved by explosive shaped charges.

When an explosive shaped charge device is detonated, the energy of the explosive material can be focused into a rod-like jet of high temperature, high pressure and high velocity gases along the axis of the shape charge explosive device. The pressures created behind the detonation front in the explosive are of such magnitude that it causes the metal of the liner to liquefy and flow like a fluid. As the liner material is collapsed toward the axis of the hollow cavity, the flowing material radially converges, creating a rod-like stretching jet of high velocity, between five and ten kilometers per second.

Historically, these jets are composed of copper, and the conventional shaped charge will give typically create a hole size that is, in a semi-infinite target; could be as high as 20% of the diameter of the shaped charge. In order to achieve the greatest jet length and penetration depth, the jetting process of a shaped charge requires the liner material to reach a high temperature during collapse, which allows plastic flow of the collapsed liner material that produces a long stretching jet.

There have been some specialized efforts by Halliburton to produce shaped charges other than conical type shaped charges for special purposes such as pipe cutting and anchor chain cutting. These type of charges are called linear shaped charges and use the Munroe principle to produce a thin sheet like jet with somewhat similar cutting power to the usual conical shaped charge. The liner is wide angle and the device is used against light structures such as wooden doors and thin walls. The vast majority of research and development in shaped charges over the past hundred years or so has been devoted to deep penetration in both military and commercial applications. Some efforts have been directed to increasing the internal angle of the liner and a shorter standoff.

Other devices using flexible linear shaped charges have been designed for breaching man-size holes in light walls, such as described in Wall AXE British, 1960. These line charge devices are collapsed from only two opposing directions producing a very irregular thin sheet-like jet that is unpredictable in its penetrating ability due to the lack of a simultaneous initiation along the apex of the line explosive. These line charges are limited in the thickness or toughness of the target they can address and are mainly used for light walls.

U.S. Pat. No. 7,753,850 places an interrupter along the jet axis inside the liner, in the flow path of the liner material. The permissible size of the interrupter for this concept can only be a small portion of the liner diameter so as to leave room for the liner to collapse. The small diameter of the interrupter does not form a large enough diameter jet to produce a full caliber hole or to hold its annular shape after it separates from the interrupter; the jet will converge into a rod and some of the precious liner length is wasted.

U.S. Pat. Publ. No. US2011/0232519 A1 shows outside and inside walls making up the circular trough of the liner. The mass of the outer wall of the liner trough, because of its greater diameter, is much greater than the mass of the inner wall. The outer wall is converging whereas the inner wall, with much less mass, is diverging; the same problem exists with the explosive quantities driving each wall of the liner. To obtain a circular or annular jet, these masses must be equal in forces when they converge on the projected axis of the liner cavity.

In steel-making, small conical shaped charges are often used to pierce taps that have become plugged with slag. Linear shaped charges, or line charges, are another type of shaped charge used in the demolition of buildings to cut through steel beams and collapse the building in a desired pattern. This type of flexible line charge creates a sheet-like jet from a two-dimensional collapse.

SWAT teams and fire departments are another user of line charges, using the Munroe principle to generate high speed material for urban wall breaching and rescue. These line charges are very inefficient and difficult to initiate in a manner conducive to achieving their full potential. Additionally, sometimes users such as police or firefighters are badly injured or killed trying to use these awkward and clumsy devices.

Explosive hole or perforation diameters in casing from these conventional charges are not greater than ½ inch in diameter. The expected perforated holes sizes can be inconsistent, varying in size to more than 50% from the target diameter. This inconsistency causes many fracturing operation issues, and small hole size limits product flow into and from the formation; if too small, the perforation will get fouled with debris and can stop flowing altogether. The hole diameter produced by a present day oil well perforator is only approximately 12% of its explosive charge diameter. Great efforts have been made over the last 50 or so years to enlarge the entry hole diameter in oil well casing without much success.

Some effort has been made with placing a conventional shaped charge ahead of the projectile in order to create a pilot hole in the rock; however, only a small gain in depth of penetration is achievable with this method because of the very small hole diameter produced by a conventional shaped charge. The hole diameter made by a conventional shaped charge jet is small, on the order of one-tenth the diameter of the explosive charge forming the jet, and it penetrates approximately 6-8 times the diameter of the charge in steel (more in rock or masonry).

There have been many efforts throughout the years to hydraulically fracture resource bearing formations, but these prior efforts have been unable to penetrate more than a few feet beyond the main well bore. Present day stimulation of oil and gas bearing formations is most predominately accomplished by hydraulic fracturing (HF), also called "fracking." Hydraulic fracturing (HF) is a time consuming multi-stage operation where the well bore is perforated with small holes or small perforations in the well casing and surrounding formation.

Although hydraulic fracturing of oil and gas bearing formations has been used for many decades, this process does not maximize the capture of valuable energy resources and it leaves valuable resources behind in the formation. During hydraulic fracturing (HF), fluids are forced into the formation through small holes or perforations in the well casing, which are formed during a perforation operation. These fluids include hydraulic fracturing fluids, which open fissures along natural lines of formation weaknesses or faults.

There are many problems associated with these hydraulic fracturing and the use of hydraulic fracturing fluids. First, the hydraulic fracturing fluids deposit proppants in the well perforations that initially maintain an open flow of fluids in the formation, but these proppants eventually grind down to powder and close up the formation fluid flow. This clogging and closure in the formation fluid flow causes production inefficiencies, which cannot be remedied by present hydraulic fracturing (HF) techniques.

Second, hydraulic fracturing (HF) can only create fracture lines that are not controlled by depth or direction, which means traditional hydraulic fracturing (HF) techniques cannot be regulated to target the highest resource bearing portion of a formation. This problem highlights one major problem with hydraulic fracturing (HF), which does not maximize the capture of valuable energy resources and leaves valuable resources behind in the formation based on this problem.

Third, traditional hydraulic fracturing (HF) techniques are very costly procedures, which consume approximately 80% of total well completion costs. The monetary costs makes traditional perforating techniques and hydraulic fracturing almost monetarily prohibitive at today's oil and gas prices.

Fourth, because hydraulic fracturing (HF) has no ability to be directional or depth controlled, the hydraulic fluids flow along formation fracture lines that follow planes of natural weaknesses in the formation material. This flow of high pressure hydraulic fracturing fluids into natural weaknesses in formation materials and formation fracture lines (e.g. faults) is accused of creating significant negative environmental impact and raised criticism and concerns about existing hydraulic fracturing (HF) techniques from the federal Environmental Protection Agency, as well as some state environmental agencies and environmentalists. Hydraulic fracturing (HF) techniques have been viewed under tighter and tighter scrutiny by these agencies and environmental advocates.

Previous efforts of energy recovery using traditional hydraulic fracturing techniques have not been successful or productive at increasing the production of energy resources from substrate formations around a borehole. In fact, the above problems will, in time, make the hydraulic fracturing (HF) operations more expensive to conduct (e.g. cost prohibitive), as well as less desirable and less practical, not to mention evoking environmental claims regarding the introduction of hydraulic fluids into fault areas of the surrounding formations, which individually or cumulatively may prevent and prohibit such uncontrolled and undirected hydraulic fracturing (HF) procedures. There is a legitimate need for an improved means of maximizing the development, recovery and production of energy resources by overcoming the existing and future problems inherent in uncontrolled and undirected hydraulic fracturing (HF) procedures.

SUMMARY OF THE INVENTION

The present invention uses shaped charge devices in the recovery of subsurface minerals and substances, which maximizes the development, production and capture of energy resources over traditional hydraulic fracturing (HF) techniques. The present invention and system reduces the steps in the perforating and fracturing operations of the mineral bearing formation compared to traditional methods, which reduces the operation time and costs incurred in the recovery, capture, production and delivery of energy resources. The present invention achieves those objectives by controlling the direction and distance of charge detonation around the well bore or well casing.

The present invention is a subterranean (non-hydraulic) shock fracturing system and process for fracturing oil and gas bearing formations, and the present invention delivers predetermined amounts of precisely placed explosive charges into the formation surrounding a bore hole or well casing. By precision controlling the delivery of predetermined explosive charges, the present invention makes possible a precision-controlled delivery of a measured quantity of explosive into a subterranean oil or gas bearing formation with the detonation of said explosive in order to fracture the formation in an intended and directionally controlled local vicinity.

The predetermined amounts of charges in the present invention produce large diameter deep penetrations into the formation; and, by coupling to the rock concussively fractures, the formation in the vicinity of this directionally and distance controlled explosive charge will increase permeability in a desired portion of the rock or formation strata. Secondary and tertiary charges can also be loaded and exploded using the present invention to increase the depth of the primary holes, enlarge the perforations, fracture the mineral bearing formation, and maximize the production, recovery and delivery of target resources from the formation. The ability to selectively "reshoot" lateral perforation holes into new wells (or underperforming old wells) with shaped charges using predetermined amounts of explosive will also improve formation communication, unlike current hydraulic fracturing (HF) methods or any previous efforts using large amounts of explosive.

Using the systems, techniques and methods in the present invention, operators now have the ability to enlarge perforation diameters, increase the explosive hole depths, control the direction of the explosive perforations, and increase energy recovery from the substrate formations, which greatly improves over existing hydraulic fracturing, rapid gas generation, and fracturing techniques. The present invention is a system and method of operation can be called a "Select Fire Gun System" or SFGS, which allows operators to perforate well bore casings with a series of individually contained primary shaped charge devices of predetermined explosive amounts, and then the present invention aligns and individually initiates a repeated succession of secondary and tertiary individually contained shaped charge devices in a series of common lateral formation holes in a controlled direction.

The Select Fire Gun System (SFGS) is composed of multiple segments, each containing a series of individual blast and containment chambers assembled in a long cylindrical arrangement, and each successive chamber contains a shaped charge or projectile (or set of same) that can be fired at with a predetermined explosive force (amount) in a controlled direction into the formation surrounding the borehole or well casing. The present invention uses this system of segmented select-fired multi-chambered shaped charge explosions to support repeated firings into perforation holes made by previously fired charges from the same SFGS system.

An important aspect of the present invention is the locking mechanism that locks the SFGS firing mechanism in the main borehole and ratchets the SFGS mechanism down or up the borehole or well casing and rotationally around inside the borehole or well casing so as to align new charges with existing lateral holes. The locking and alignment subsystems facilitate the depth, direction and distance control of shaped charges or explosives bearing projectiles to be propelled deep into the formation through the existing holes made by primary shaped charges and detonated at or near the hole created at the location of the previous shaped charge penetration.

The present invention method and system can be repeated many times, which allows for a greater lateral distance to be reached from the borehole in a controlled depth and distance in the borehole or well casing. Fracturing along and across natural formation planes can be accomplished using the present invention, which allows for the recovery and capture of a larger volume of the energy resources in a formation surrounding a borehole through a more thorough draining of the resource bearing formation as well as minimizing the flow of fluids along natural faults in the formation. Each time a charge is detonated outside the well casing, the detonation can be coupled to the formation so that it sends a shock wave through the formation, which allows operators to also seismically measure and read the shock waves in the well bore or at many locations around the main bore hole, which in turn allows operators to more precisely analyze many items of interest and more precisely determine the varying densities surrounding the borehole.

The present invention is far more efficient, precise and controlled than traditional hydraulic fracturing (HF) techniques because the present invention controls distance of explosive force, direction of the explosive force and depth of the explosive force in the borehole or well casing. The present invention increases permeability of the formation and increasing directional control of the concussive shattering of the rock around the epicenter of the detonation of the explosive charge deposited in the formation. The present invention is a mineral bearing formation fracturing system and process that eliminates separate steps in the traditional perforating and fracturing operations and reduces the steps in the fracturing operation, which achieves the objective of increasing production and cost efficiency of the energy recovery operations.

The present invention achieves the object of maximizing production, capture and delivery of energy resources from a formation surround a borehole or well casing by delivering a predetermined measured quantity of explosive into a subterranean oil or gas bearing formation, detonating said explosive at a controlled depth and direction, and fracturing the formation in the local vicinity of a resource deposit using directional, depth, and distance controlled charge explosions. The cost of the shock stimulation of a well is estimated to be about 80% less than hydraulic fracturing, and the present invention has a lower environmental impact than hydraulic fracturing. As an added benefit, the present invention relating to shock fracturing allows operators to secure the capture of seismic readings directly from the formation of interest.

DESCRIPTION OF THE FIGURES

The inventor will use descriptive drawings to describe the device and how it functions with the incorporated specification description. The above, and other objects and advantages of the present invention, will be better understood based on the following detailed description taken in conjunction with the accompanying drawings, in which like reference characters refer to like parts throughout, and in which:

FIG. 7 is a sectional view along vertical line 7-7 in FIG. 6 that is perpendicular to the horizontal collapse plane of the liner wings of the Axilinear shaped charge embodiment of FIG. 6;

FIG. 8 is a view of the jet formed by the device embodiment of FIG. 6 that illustrates the orientation of the spade jet with respect to the liner wings of FIG. 6;

FIG. 9 is a sectional view along horizontal line 9-9 in FIG. 6 that is coplanar to the horizontal collapse plane of the liner wings, of the Axilinear shaped charge embodiment of FIG. 6;

FIG. 10 is a view of the jet formed by the device embodiment of FIG. 6 that illustrates the orientation of the spade jet with respect to the liner wings in FIG. 6;

FIG. 21 is a front view of a variation of the embodiment with rotated shape charge devices shown in FIG. 17.

FIG. 22 is a longitudinal sectional view along line H-H in FIG. 21.

Figure 1:
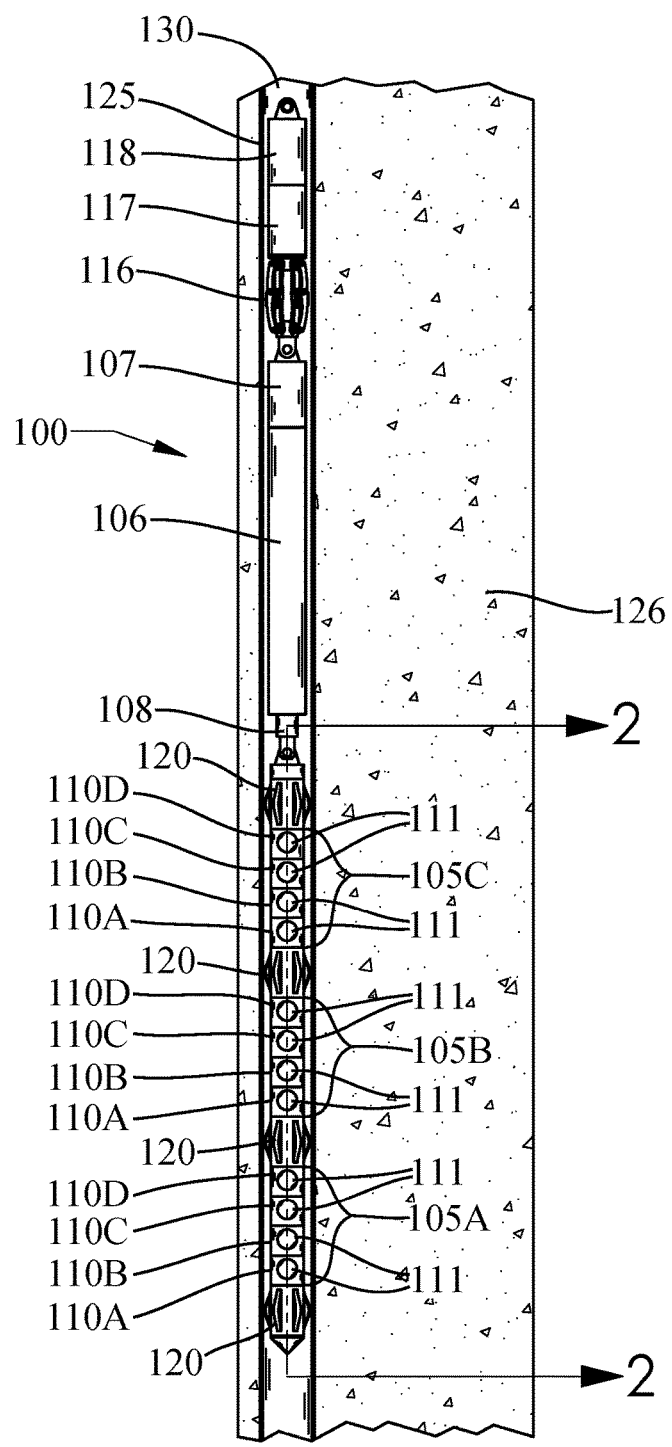
FIG. 1 is a cross-sectional side view of the present invention as used in a subterranean well bore.

While the invention is susceptible to various modifications and alternative forms, specific embodiments thereof have been shown by way of example in the drawings and are herein described in detail.

DETAILED DESCRIPTION OF THE PREFERRED EMBODIMENTS

The present invention is a subterranean (non-hydraulic) shock fracturing system and process for fracturing oil and gas bearing formations, and the present invention delivers predetermined amounts of precisely placed explosive charges into the formation surrounding a bore hole or well casing. The present invention uses shaped charge devices in the recovery of subsurface minerals and substances, which maximizes the development, production and capture of energy resources over traditional hydraulic fracturing (HF) techniques. The present invention achieves those objectives by controlling the direction and distance of charge detonation around the well bore or well casing.

FIG. 1 depicts the present invention, which can be called a Select Fire Gun System (SFGS) 100, is shown prior to explosive charge initiation in a subterranean formation 126 inside a well borehole 130 and a well casing 125. The explosive charges in the present invention SFGS system consists of three primary segments 105A, 105B, and 105C, with each segment having four blast chambers 110A-110D that each contains a single explosive shaped charge, which are each respectively covered with a screw port cover 111. Since the explosive shaped charges are fired separately, the SFGS assembly must consist of separate blast chambers for each charge or set of charges because of fratricide damage to adjacent unfired charges.

The present invention SFGS has three primary location and stabilization control subsystems that precisely control the depth, centralized borehole, and directional placement in the borehole of the explosive shaped charges in blast chambers 110A-110D in primary segments 105A, 105B and 105C, which include: (1) deployable centralizers, (2) jaws and locking devices, and (3) rotational and linear actuator. By precision controlling the delivery of predetermined explosive charges, the present invention makes possible a precision-controlled delivery of a measured quantity of explosive into a subterranean oil or gas bearing formation with the detonation of said explosive in order to fracture the formation in an intended and directionally controlled local vicinity. While three control subsystems are described in this embodiment, the number of subsystems can vary from 1 to more than 20, as long as the number of subsystems does not compromise the positioning and stabilization controls.

The system has deployable centralizers 120 located between each primary segments 105A, 105B and 105C, which keeps the explosive shaped charges in blast chambers 110A-110D in the SGFS system centralized in the borehole 130 during detonation. Centralizing the explosive shaped charges in blast chambers 110A-110D in the SGFS system in the borehole provides during detonation provides equal and consistent standoff distance between all charges and well casing 125 at detonation. The centralizers 120 can also provide rotation of each primary segment 105A, 105B and 105C, and their respective explosive shaped charges in blast chambers 110A-110D in the SGFS system, which also allows for precision directional control of detonation at any radial angle about the longitudinal axis of the well bore 130, which maximizes charge performance of the explosive charge upon detonation.

A power device 118 coupled to a wire line and hook, which is used to raise and lower the present invention SFGS system in the borehole. A locking device 117 is coupled to the power device 118, and the locking device 117 has jaws 116 that can be expanded or retracted by an electric motor, hydraulic motor, hydraulic cylinder or other suitable power device 118. The positional locking device 117 with jaws 116 effectively isolates the explosive shaped charges in blast chambers 110A-110D in the primary segments 105A, 105B and 105C, from the wire line coupled to the power device 118 and holds the present invention SFGS system at a desired depth position in the borehole 130.

An important aspect of the present invention is the locking mechanism that locks the SFGS firing mechanism in the main borehole and ratchets the SFGS mechanism down or up the borehole or well casing and rotationally around inside the borehole or well casing so as to align new charges with existing lateral holes. The locking and alignment subsystems facilitate the depth, direction and distance control of shaped charges or explosives bearing projectiles to be propelled deep into the formation through the existing holes made by primary shaped charges and detonated at or near the hole created at the location of the previous shaped charge penetration.

Once locked at a depth in the borehole 130 by the jaws 116 of the locking device 117, the position of the explosive shaped charges in blast chambers 110A-110D in the primary segments 105A, 105B and 105C can be precisely controlled in a linear and rotational direction in the borehole 130 by the linear actuator 106, which can reposition the explosive shaped charges in blast chambers 110A-110D in the primary segments 105A, 105B and 105C in the SFGS system longitudinally (up and down) or rotationally (radially 360 degrees in the borehole) and horizontally (side to side) in borehole 130. Linear actuator 106 contains a rod 108 that can be extended/retracted vertically, rotated radially around, or horizontally (side-to-side) to position the explosive shaped charges in blast chambers 110A-110D in the primary segments 105A, 105B and 105C in the SFGS system in the borehole 130.

Linear actuator 106 can be driven by an electric motor, hydraulic motor, hydraulic cylinder or other suitable power device 107. The linear actuator rod 108 can be extended and positioned longitudinally along the longitudinal axis, rotationally in a radial direction around, and horizontally (side-to-side) in the borehole 130 to properly position the segmented charges at the proper depth, distance, angle of inclination, direction in the borehole 130. Linear actuator 106 facilitates the precise charge placement longitudinally, rotationally (radially), and inclination angles in well bore 130, providing the ability to align primary, secondary and tertiary charges with each other or in new directions.

The predetermined amounts of charges in the present invention produce large diameter deep penetrations into the formation; and, by coupling to the rock concussively fractures, the formation in the vicinity of this directionally and distance controlled explosive charge will increase permeability in a desired portion of the rock or formation strata. Secondary and tertiary charges can also be loaded and exploded using the present invention to increase the depth of the primary holes, enlarge the perforations, fracture the mineral bearing formation, and maximize the production, recovery and delivery of target resources from the formation. The ability to selectively "reshoot" lateral perforation holes into new wells (or underperforming old wells) with shaped charges using predetermined amounts of explosive will also improve formation communication, unlike current hydraulic fracturing (HF) methods or any previous efforts using large amounts of explosive.

The SFGS shown in FIG. 1 can be modified to have more or less segments (from one segment to more than several dozen segments) and shaped charges as needed to accomplish the desired effect on formation 126. Moreover, the bore longitudinal axis does not need to align relatively to the surface plane, and the present SFGS system does not need a well bore casing for this system to work.

The use of super caliber charges described below with respect to explosive shaped charges in blast chambers 110A-110D in the primary segments 105A, 105B and 105C in the SFGS system make larger than charge diameter holes, which can greatly improve the performance and capabilities of the present invention SFGS system. The present invention SFGS system 100, however, can be equipped with many types of shaped charges, kinetic penetrators, and self-contained shaped charges or grenades.

When using super caliber shaped charges such as explosive shaped charges in blast chambers 110A-110D in the primary segments 105A, 105B and 105C in the SFGS system in the initial charge creates a lateral hole diameter in the casing and formation that is large enough for secondary and tertiary charges, of the same diameter, to be inserted into the lateral holes to deepen the hole and shock fracture the formation. Many current conventional shaped charges, kinetic penetrators, grenades, and gas charges can be used alone or in conjunction with super caliber shaped charges in the present invention SFGS system. Conventional perforating charges make holes much smaller than the charge diameter, and these conventional charges can be used in the SFGS to increase perforation diameter and depth.

Using the systems, techniques and methods in the present invention, operators now have the ability to enlarge perforation diameters, increase the explosive hole depths, control the direction of the explosive perforations, and increase energy recovery from the substrate formations, which greatly improves over existing hydraulic fracturing, rapid gas generation, and fracturing techniques. The present SFGS invention allows operators to perforate well bore casings with a series of individually contained primary shaped charge devices of predetermined explosive amounts, and then the present invention aligns and individually initiates a repeated succession of secondary and tertiary individually contained shaped charge devices in a series of common lateral formation holes in a controlled direction.

The Select Fire Gun System (SFGS) in the present invention is composed of multiple segments, each containing a series of individual blast and containment chambers assembled in a long cylindrical arrangement, and each successive chamber contains a shaped charge or projectile (or set of same) that can be fired at with a predetermined explosive force (amount) in a controlled direction into the formation surrounding the borehole or well casing. The present invention uses this system of segmented select-fired multi-chambered shaped charge explosions to support repeated firings into perforation holes made by previously fired charges from the same SFGS system.

Figure 2:
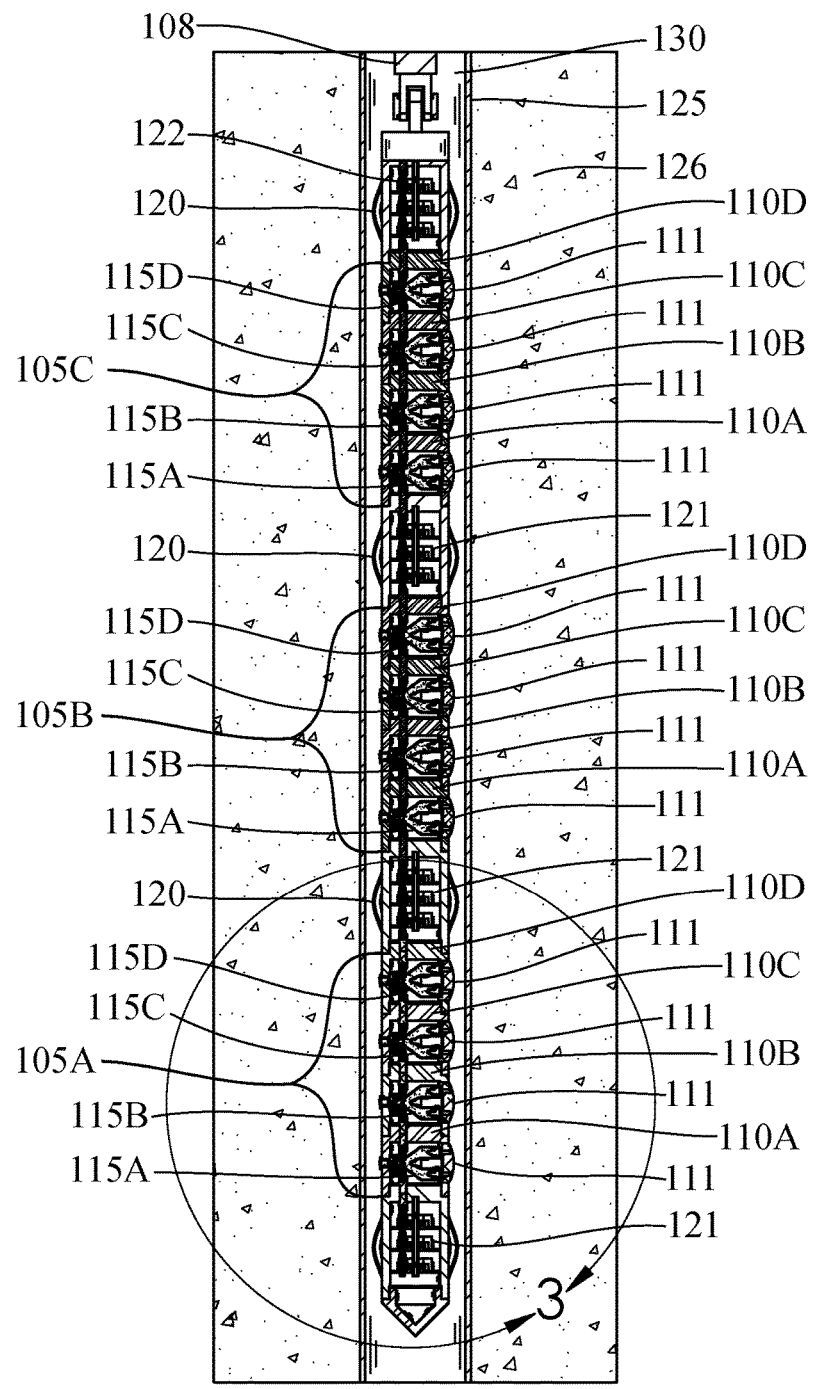
FIG. 2 is an expanded longitudinal cross-sectional side view of the present invention along line 2-2 in FIG. 1 further clarifying the construction of the present invention.

FIG. 2 is a cross-sectional view about line 2-2 in FIG. 1, which is an expanded internal cross sectional view of the three primary segments 105A, 105B, and 105C, each segment consisting of four blast chambers 110A-110D that respectively contain unfired charges 115A-115D. Each segment 105A, 105B, and 105C has a centralizer 120 in between each primary segment 105A, 105B and 105C, and each end of the primary segments. The centralizer 120 isolates the three primary segments 105A, 105B, and 105C, the four blast chambers 110A-110D and unfired charges 115A-115D contained therein, and controls the concentric alignment of those elements in the well bore 130 and casing 125.

The centralizers 120 work in conjunction with the linear actuator 106 to orient, position and maintain the three primary segments 105A, 105B, and 105C, the four blast chambers 110A-110D and unfired charges 115A-115D contained therein in linear, longitudinal, radial, horizontal and concentric alignment with the well bore 130 and casing 125. Maintaining a close alignment between the longitudinal axis of the gun and well bore longitudinal axis keeps all the segment 105A, 105B, and 105C shaped charges 115A-115D at an equal distance or stand off to the well bore 130 and casing 125, which normalizes each charges performance.

Each blast chamber 110A-110D has a screw port cover 111 that seals the blast chamber, and prevents well bore fluids from entering the chamber and interacting with the shaped charge or the jet produced after charge detonation. Screw port cover 111 is designed to work with circular linear or rod jet producing shaped charges. Segments 105A, 105B, and 105C can be modified to have more or less blast chambers and charges as needed to accomplish the desired effect on formation 126. The centralizers 120 house firing electronics 121 for each segment and positioning electronics 122 that control the linear, longitudinal, radial, horizontal and concentric alignment with the well bore 130 and casing 125.

The subterranean charge firing electronics 121 and positioning electronics 122 systems communicate with master control electronics located in the linear actuator 106 or on computer components on the surface to align three primary segments 105A, 105B, and 105C, each segment consisting of four blast chambers 110A-110D and the unfired charges 115A-115D on linear, longitudinal, radial, horizontal and concentric alignment with the well bore 130 and casing 125. The positioning electronics 122 work with other positioning electronics to assure linear, longitudinal, radial, horizontal and concentric alignment with the well bore 130 and casing 125 from each segment to be fired at the desired new location or into an existing hole made by earlier charges.

Since the charges 115A-115D are selectively fired from each segment a firing system and separate blast chambers 110A-110D for each set of charges are required to avoid fratricide damage of other charges in the gun. Each charge or group of charges will be equipped with its own capacitance discharge initiation system circuit in the firing electronics 121 and fired with a signal from the master controller.

The present invention method and system can be fire perforation holes in the areas surrounding the borehole 130 or well casing repeatedly or many times over, which allows for a greater lateral distance to be reached from the borehole 130 in a controlled depth and distance in the borehole 130 or well casing. Fracturing along and across natural formation planes can be accomplished using the present invention, which allows for the recovery and capture of a larger volume of the energy resources in a formation surrounding a borehole through a more thorough draining of the resource bearing formation, as well as minimizing the flow of fluids along or through natural faults in the formation. Each time a charge is detonated outside the well casing, the detonation can be coupled to the formation so that it sends a shock wave through the formation, which allows operators to also seismically measure and read the shock waves in the well bore or at many locations around the main bore hole, which in turn allows operators to more precisely analyze many items of interest and more precisely determine the varying densities surrounding the borehole.

Figure 3:
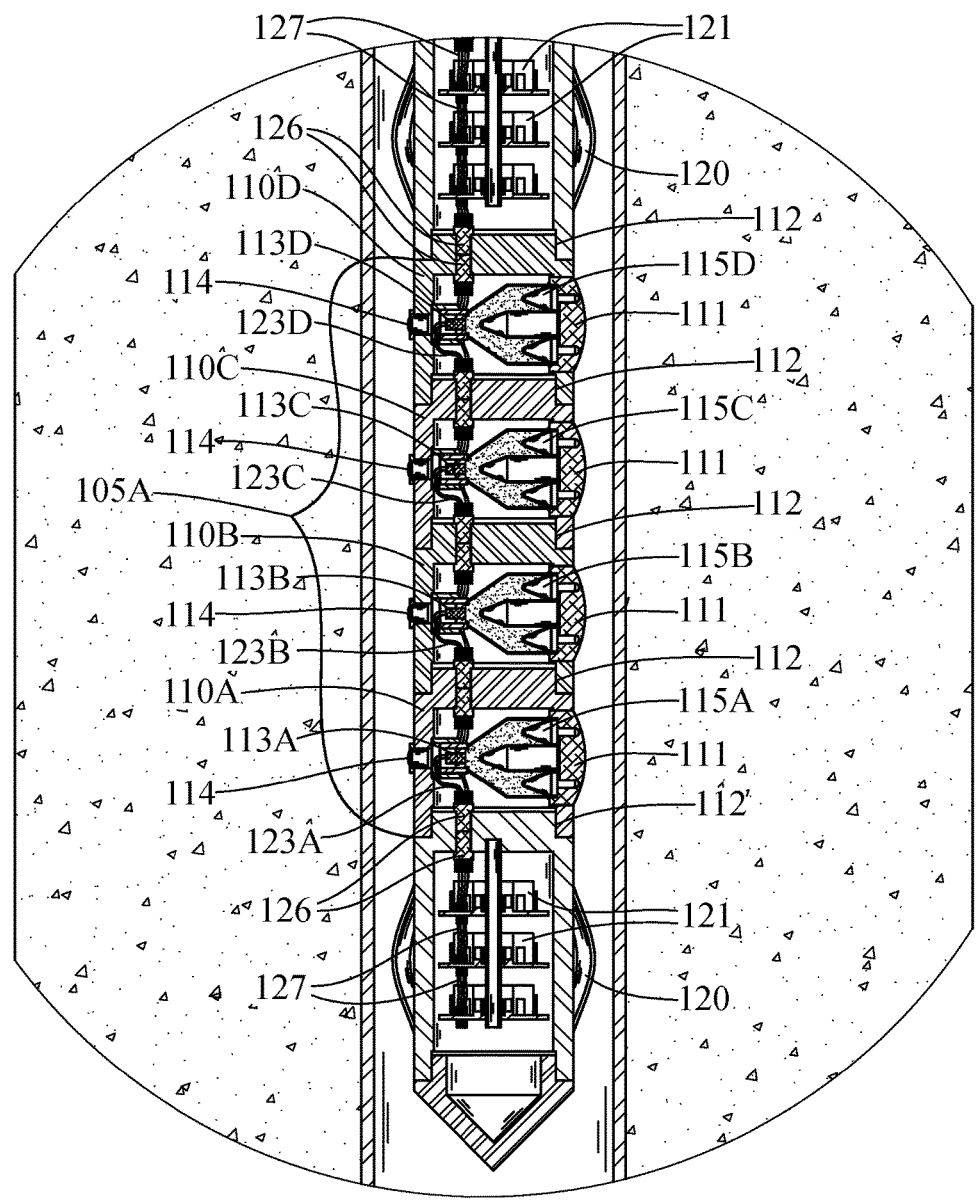
FIG. 3 is an expanded longitudinal cross-sectional side view of the present invention along the expanded circle 3 in FIG. 2 further clarifying the construction of the blast chambers of the present invention.

FIG. 3 is a cross-sectional detailed view of segment 105A and it shows the construction of the device in FIGS. 1 and 2 (incorporated by reference herein). Segment 105A consists of four blast chambers 110A-110D coupled between centralizers 120, which are joined by threaded, welded or other suitable fastening method at connection points 112.

Each one of the blast chambers 110A-110D contain a shaped charge device 115A-115D, respectively, a detonator 113A-113D, respectively, and a set of control and detonator wiring 123A-123D. Control wiring connection ports 126 are located on each top and bottom end of each blast chamber 110A-110D, and each centralizer 120, and the firing electronics 121 circuit boards and control wiring 127. Blast chambers 110A-110D are hollow cylinders with a sufficient material thickness to eliminate fratricide damage of adjacent charges during detonation. Control wiring connection ports 126 isolate blast pressures between each blast chamber 110A-110D, and provides a passage for the control wiring between blast chambers and firing electronics 121 contained in centralizers 120 and control wiring 127.

The control and detonator wiring in these figures is shown to be routed inside blast chambers 110A-110D. This control and detonator wiring can be replaced with a remote radio controlled switches or the wiring can also be routed along the outside of the chambers. Control wiring 127 electronically couples the firing electronics 121 circuit boards, relay signals between downhole electronics to ground control systems located on the surface or elsewhere on the downhole device. Each blast chamber 110A-110D has a screw port cover 111 that keeps well bore fluids from entering the chamber and acts as a forward charge retainer. Each blast chamber 110A-110D also has a blowout port 114 at the rearward end of charge 115A-115D that relieves detonation blast pressures, reduces chamber material fatigue, and allows chambers to be used multiple times before failure.

Figure 2A:
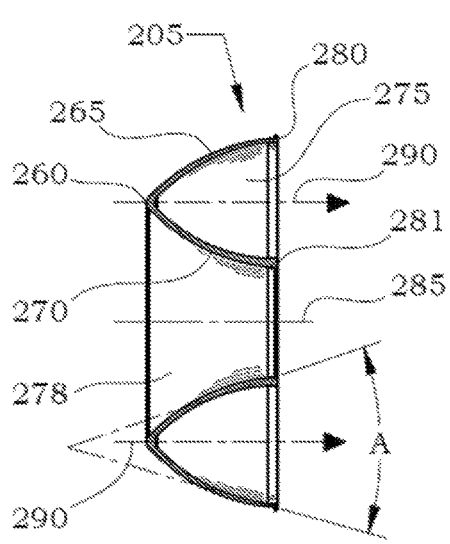
FIG. 2A is a cross-sectional view of a swept tulip profile (STUP) liner.
Figure 3A:
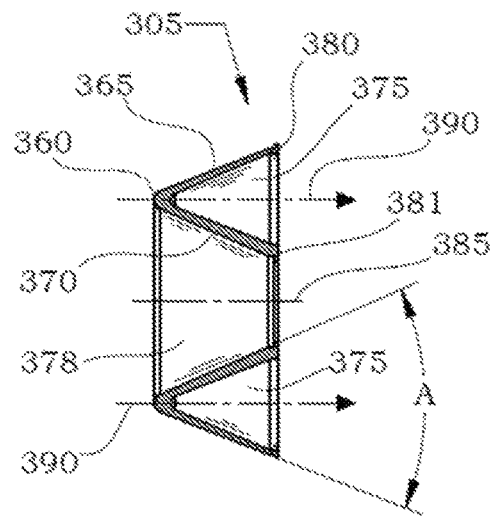
FIG. 3A is a cross-sectional view of a swept conical profile (SCP) liner.

FIGS. 2A and 3A show two liners that can be used in the blast chambers 110A-110D. FIG. 2A shows STUP liner 205 that consists of an outer base end 280, outside wall 265, apex 260, inner base end 281, inside wall 270, axis of symmetry 285, collapse axis 290, an outer surface 278, an inner surface 275, and included angle A. Collapse axis 290 is shown parallel to the axis of symmetry 285, but the collapse axis can be set to match almost any angle relative to the axis of symmetry 285 that would represent a converging or diverging jet trajectory formed by the detonation wave and STUP liner 205.

The arched walls of the STUP liner 205 can outperform the straight walls of a conical liner since the arc of the liner walls tends to reduce the included angle A from apex 260 to the inner base end 281 and outer base end 208. The radius of arched STUP liner 205 walls can be increased or decreased to obtain desired jet velocity, length and mass. Outside wall 265 has on outward concave curvature relative to symmetrical axis 285 and inside wall 270 has an inward convex curvature relative to symmetrical axis 285. While planar wall liners can be used, the STUP liner 205 design reduces the jet stretch rate by speeding up the aft end or tail of the jet making the jet shorter more robust and perform better at longer target standoff.

The thickness of inside wall 270 gradually increases from the apex 260 to the inner base end 281, and the thickness of outside wall 265 gradually decreases from apex 260 to the outer base end 280. The wall thickness is varied in this way to balance the explosive charge to STUP liner 205 mass ratios, which also balances the momentum of the collapse of the STUP liner 205 walls. Liner wall momentum balancing will insure that inside wall 270 and outside wall 265 will meet at the collapse axis 290 in concert to produce stable jetting. STUP liners can be challenging to balance since the mass of the outer wall 270 increases as the diameter increases from apex 260 to base end 280 and the mass of the inner wall 265 decreases as the diameter decreases from apex 260 to base end 281.

Liner thickness of shaped charges is dependent on the overall diameter of the device. The liner wall should increase in thickness as the device diameter increases and decrease in thickness as the device diameter decreases. Shaped charges scale making this device in a much larger or smaller size, as the shaped charges can have varying wall thicknesses and profiles depending on material, density, and desired effect on a target. For example, a 5 inch diameter liner of the STUSC the inside wall needs to be between 1-3 mm at the apex and taper toward the base end to between 2-5 mm. The outside wall must taper the reverse direction from between 1.5-3 mm at the apex and tapering down to between 1-2.5 mm at the base. These dimensions can be refined further to give the most tailored jet to address the specific target material.

The outside wall 265 and inside wall 270 of STUP liner 205 are set at an included angle A, which can be changed to produce desired jetting characteristics (i.e., jet mass, and velocity). STUP liners require approximately a 30-120 degree included angle A between the outside wall 265 and inside wall 270 for optimum jetting. Greater included angles shorten the length of the STUP liner 205 along the axis of symmetry 285 and shortens the length of the inside wall 270 and outside wall 265, this shortening forces the diameter and mass of the outside wall 265 to increase at a higher rate from apex 260 to outer base end 280, inversely the inside wall 270 decreases at a higher rate in diameter and mass from apex 260 to inner base end 281. The included angle A and mass distribution of the inside wall 270 and outside wall 265 must be tailored to each other to produce a straight axisymmetric hollow cylindrical jet on collapse axis 290, that projects in the direction of the collapse axis 290 arrow and is parallel with symmetrical axis 285 of the SCP liner 205.

Detonation pressures from the explosive collapse of the STUP liner 205 outside wall 265 moving it into a smaller volume thusly increasing its bulk density and velocity, while being driven toward the collapse axis 290. At the same time the STUP liner 205 inside wall 270 is driven toward collapse axis 290 by the explosive; the inside wall 270 driven material is moved, decreasing in bulk density and velocity due to an increase in diameter as it moves toward the collapse axis 290. This process shows the importance of momentum balancing the high velocity collapsing STUP liner 205 walls in order to produce a viable hollow cylindrical jet.

Figure 2B:
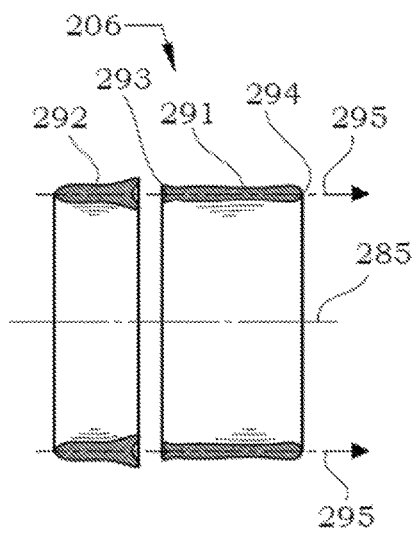
FIG. 2B is a cross-sectional view of a jet formed from a swept tulip (STUP) liner in the shape charge device.

FIG. 2B is a cross-sectional view of a typical hollow cylindrical projectile (HCP) 206 produced by a STUSC. The HCP 206 consist of a jet 291, slug 292, jet tail 293, jet tip 294, projection axis 295, and symmetrical axis 285. Jet 291 and slug 292 velocities, angle of projection, thickness, length and inside diameter can vary depending on the design of the STUSC. This depiction of HCP 206 is at a finite time after the detonation of a STUSC. The HCP 206 at an earlier time frame after detonation would show the jet 291 and slug 292 shorter in length and possibly still connected. At a later time frame, jet 291 and slug 292 would become longer, thinner and further separated because of the ductile stretching of the HCP material. The projection axis 295 is shown parallel to symmetrical axis 285 but could be almost any angle either converging or diverging depending on the STUSC design and intended use.

The tulip swept liner designs both have inner and outer liner wall curvatures but the direction of curvatures are opposite. A convex trumpet liner has outside wall 265 and inside wall 270 convex to the collapse axis 290, whereas a tulip liner outside wall 265 and inside wall 270 is concave to the collapse axis 290.

FIG. 3A shows SCP liner 305 that consists of an outer base end 380, outside wall 365, apex 360, inner base end 381, inside wall 370, axis of symmetry 385, collapse axis 390, an outer surface 378, an inner surface 375, and included angle A. Collapse axis 390 is shown parallel to the axis of symmetry 385, but can be almost any angle relative to the axis of symmetry 385 that would represent a converging or diverging jet trajectory formed by the detonation wave and SCP liner 305.

The thickness of inside wall 370 gradually increases from the apex 360 to the inner base end 381, and the thickness of outside wall 365 gradually decreases from apex 360 to the outer base end 380. The wall thickness is varied in this way to balance the explosive charge to SCP liner 305 mass ratios, which also balances the momentum of the collapse of the SCP liner 305 walls. Liner wall momentum balancing will insure that inside wall 370 and outside wall 365 will meet at the collapse axis 390 in concert to produce stable jetting. SCP liners can be balanced when the mass of the outer wall 370 increases as the diameter increases from apex 360 to base end 380 and the mass of the inner wall 365 decreases as the diameter decreases from apex 360 to base end 381.

Liner thickness of shaped charges is dependent on the overall diameter of the device. The liner wall should increase in thickness as the device diameter increases and decrease in thickness as the device diameter decreases. Shaped charges scale allowing any smaller or larger size of shaped charges by varying wall thicknesses and profiles depending on material, density, and desired effect on a target.

For example, a 5 inch diameter liner of the SCSC the inside wall needs to be between 1-3 mm at the apex and taper toward the base end to between 2-5 mm. The outside wall must taper the reverse direction from between 1.5-3 mm at the apex and tapering down to between 1-2.5 mm at the base. These dimensions will be refined with numerical code and experiment to give the most tailored jet to address the specific target material.

The outside wall 365 and inside wall 370 of SCP liner 305 are set at an included angle A that can be changed to produce desired jetting characteristics (i.e., jet mass, and velocity). SCP liners require approximately a 30-120 degree included angle A between the outside wall 365 and inside wall 370 for optimum jetting. Greater included angles shorten the length of the SCP liner 305 along the axis of symmetry and shortens the length of the inside wall 370 and outside wall 365, this shortening forces the diameter and mass of the outside wall 365 to increase at a higher rate from apex 360 to outer base end 380, inversely the inside wall 370 decreases at a higher rate in diameter and mass from apex 360 to inner base end 381. The included angle A and mass distribution of the inside wall 370 and outside wall 365 must be tailored to each other to produce a straight axisymmetric hollow cylindrical jet on collapse axis 390, that projects in the direction of the collapse axis 390 arrow and is parallel with symmetrical axis 385 of the SCP liner 305.

Detonation pressures from the high explosive collapse the SCP liner 305 outside wall 365 moving it into a smaller volume thusly increasing its bulk density and velocity, while being driven toward the collapse axis 390. At the same time the SCP liner 305 inside wall 370 is driven toward the collapse axis 390 by the high explosive; the inside wall 370 driven material is moved, decreasing in bulk density and velocity due to an increase in diameter as it moves toward the collapse axis 390. This process further explains the important and tedious task of momentum balancing the high velocity collapsing SCP liner 305 walls in order to produce a viable hollow cylindrical jet.

Figure 3B:
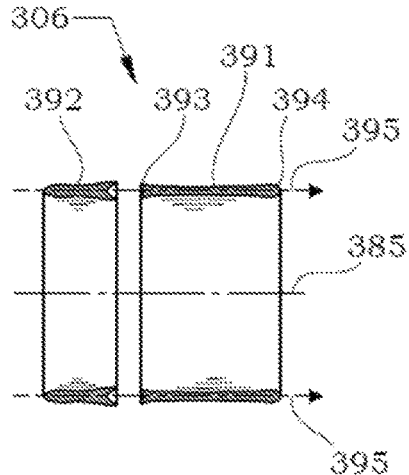
FIG. 3B is a cross-sectional view of a jet formed from an SCSC liner.

FIG. 3B is a cross-sectional view of a typical hollow cylindrical projectile (HCP) 306 produced by a SCSC. The HCP 306 consists of a jet 391, slug 392, jet tail 393, jet tip 394, projection axis 395, and symmetrical axis 385. Jet 391 and slug 392 velocities, angle of projection, thickness, length and inside diameter can vary depending on the design of the SCSC.

This depiction of HCP 306 is at a finite time after the detonation of a SCSC. The HCP 306 at an earlier time frame after detonation would show the jet 391 and slug 392 shorter in length and possible still connected. At a later time frame, jet 391 and slug 392 would become longer, thinner and further separated because of the ductile stretching of the HCP material. The projection axis 395 is shown parallel to symmetrical axis 385 but could be almost any angle either converging or diverging depending on the SCSC design and intended use.

The SCSC is balancing the momentums of the collapsing inner 370 and outer 365 liner walls producing a large diameter stable projectile that will remove the full diameter of target material creating a hole without leaving behind a center core. The momentums of a SCSC should be matched correctly so the jet will follow the desired trajectory and be of insufficient mass for desired target penetration.

Figure 3C:
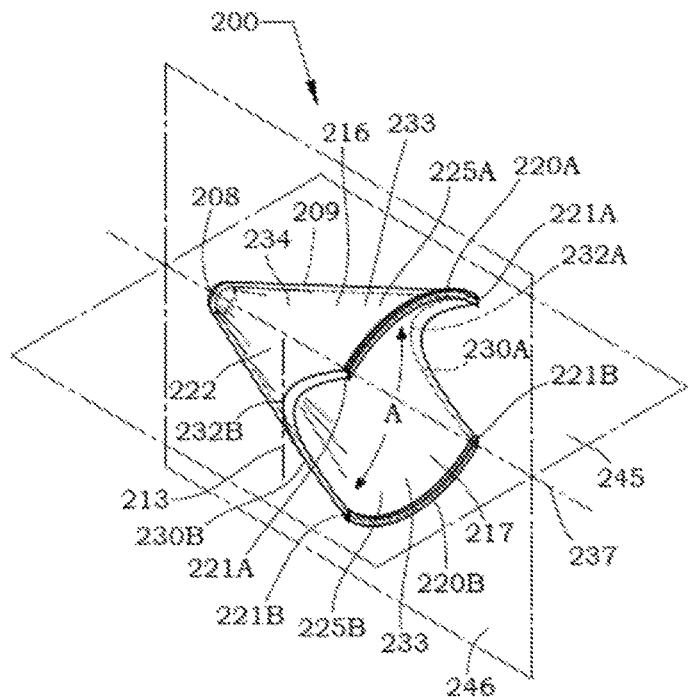
FIG. 3C is a perspective view of a single conical Axi-Linear extended wing liner used in the FIG. 1 embodiment.
Figure 3D:
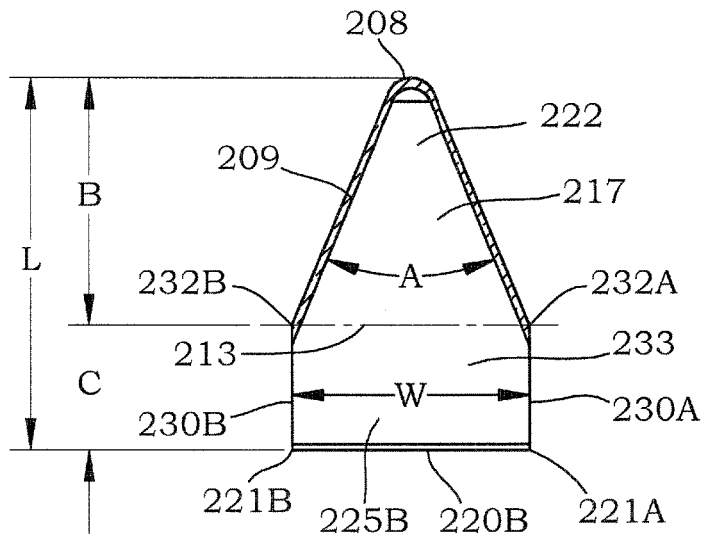
FIG. 3D is a sectional view along a horizontal line for a single conical Axi-Linear extended wing liner used in the FIG. 3C embodiment that further illustrates the full and partial conical sections.
Figure 3E:
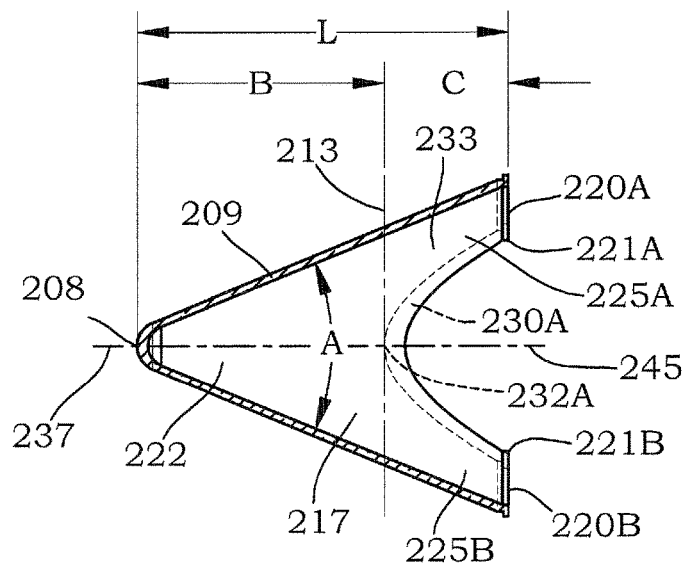
FIG. 3E is a sectional view along a vertical line for a single conical Axi-Linear extended wing liner used in the FIG. 3C embodiment that further illustrates the full and partial conical sections.

FIGS. 3C, 3D and 3E illustrate a EW liner that can be used in the device of the present invention, which consists of apex 208 toward the aft end of the full circumference conical section "B" 222, and a partial circumference wing section "C" 233 with base ends 220A and 220B, liner wing extensions 225A and 225B, and wing base arc ends 221A and 221B toward the forward end of EW liner 200. The liner wing extensions 225A and 225B extend or protrude in a forward direction from section A 222 beginning at wing vertex 232A and 232B and ending at the base ends 220A and 220B. Wing vertex 232A and 232B are positioned longitudinally at vertical line 213 where the liner transitions from the full circumference conical section B 222 into a partial circumference conical or other shape wing section C 233. Liner wall 209 of section B 222 and section C 233 can vary in thickness, curvature, and included angle A can be increased or decreased to achieve desired rod and spade jet velocities and mass.

The conical section B 222 and wing section C 233 share a common longitudinal symmetrical axis 237, section C 233 also has a horizontal collapse plane 245 in the 3 to 9 o'clock position and vertical plane 246 in the 12 to 6 o'clock position they are perpendicular to each other and intersect each other at symmetrical axis 237. Section B 222 is axisymmetric or symmetrical about axis 237 in all radial planes for 360 degrees, whereas section C 233 has two parabolic faces 230A and 230B that are planar symmetric about vertical plane 246; and two extended wings 225A and 225B that are planar symmetric about horizontal plane 245 and also axisymmetric between the wing arc ends 221A and 221B about axis 237. The EW liner 200 is a modified hollow cone, but could also be other relative hollow shapes (i.e. hemisphere, trumpet, tulip), having two opposing equal sections removed at the base end of the liner, creating two extended wings like 225A and 225B and two parabolic faces like 230A and 230B.

The absence of the two opposing equal liner wall sections at the liner base end creates two equal 180 degree opposed liner wing extensions 225A and 225B or flutes. The included angle A of the hollow conical liner and the longitudinal length of the full section B 222 portion of the liner determines the longitudinal wing length from wing vertex 232A and 232B to the base end 220A and 220B of the extended wings 225A and 225B or fluted portions of the liner and thusly the amount of the liner wall 209 material that is dedicated to producing the spade or flattened portion of the jet.

The longitudinal length of section B 222 and the extended wings 225A and 225B or flutes can be increased or decreased to achieve the desired ratio of rod to spade length of the jet created from EW liner 200. The thickness of the liner wall 209 can gradually increase or decrease from the apex 208 to the base end 220A and 220B or anywhere along the wall length; a tapering liner wall 209 thickness will help balance the liner to HE mass ratio as the liner cone diameter increases toward the base end 220A and 220B.

Liner thickness of shaped charges are dependent on the overall diameter of the device, the liner wall 209 should increase in thickness as the device diameter increases and decrease in thickness as the device diameter decreases. Shaped charges scale so it is possible to make this device in any size by varying liner wall thicknesses and profiles depending on liner material type, liner density, the jet velocity required, and desired effect on a target. The winged exterior of the liner 200 is 216 and the full conical section of the liner 200 is 234. The EW liner 200 could be made from many profiles including cones, tulips, trumpets, hemispherical, etc. to accomplish desired effects on targets.

The axisymmetric wing extensions 225A and 225B curvature, section C 233 of the Axi-Linear liner wall 209 material support the convergence of material to create a high velocity flattened deep penetrating spade jet on horizontal plane 245. The axisymmetric curvature of the liner wings prevents the formation of a conventional planar symmetric "V" shaped low velocity linear shaped charge.

The combination of the hybrid axisymmetric and planar symmetric EW liner 200 used in a precision Axi-Linear shaped charge produces the necessary material convergence for a high velocity rod and spade shaped stretching jet above 4.0 km/s that is capable of producing deep hydrodynamic plastic target material penetrations from a much lower HE to liner mass ratio than a conventional linear shaped charge. The present invention avoids the problems associated with conventional linear shaped charges having large explosive to liner mass ratios; namely, the formation of low velocity (about 2.0 km/s) thin blade or ribbon jet that produce shallow target cuts (mostly non-plastic erosion much like water jet cutting) from "V" shaped planar symmetric liner walls.

The present invention is a high velocity precision shape charge, which can be distinguished from conventional linear charges that are non-precision low efficiency cutting charges, without axisymmetric radial convergence. Two types of shaped charges include an Axisymmetric shape charge and a linear or planar symmetric. An axisymmetric shaped charge is basically a hollow cone or other similar shaped liner that is symmetric about a central longitudinal axis. Liners are usually made from copper, although it could be made of many other materials, having an explosive billet to which the outside of the liner is exactly mated.

A linear shaped charge, sometimes referred to as a line charge, is essentially a V shaped straight hollow thin walled trough backed on the outside of the V by an appropriately shaped explosive mass. When detonated above the apex of the liner, this linear shaped charge produces sheet or ribbon-like jetting. The velocity from this type of shaped charge is in the 2-3 km/s range with little or no velocity gradient and consequent shorter jet and less penetration. The jetting occurring in this device is not Munroe jetting as the collapse is only two dimensional (does not have axisymmetric convergence) and does not reach the required temperature for plastic flow to take place. As a further recognition of the inefficiency of a conventional linear shaped charge, the detonation wave does not reach the full length of the liner apex simultaneously, this causes an undesirable dispersion of the resulting spray of liner material and no real continuity to the spray.

The jet produced by each Axi-Linear shaped charge in the present invention is a stretching combination of a rod and spade shaped like projectile having a velocity gradient from tip to tail, tip velocity of the this jet could be as high as 10 km/s depending on the included angle, charge to mass ratio, confinement, and shape of the liner, jet tail velocities are about 2 km/s. The present invention achieves higher velocity precision formation of an explosive jet without the need to increase the explosive mass, which would be required in the prior art conventional charge.

The present invention is much more efficient and effective in that conventional linear charges cannot make precision deep target cuts or penetrations like the claimed invention because of their large HE to liner mass ratio, and typically, prior art shape charges produce a wide cratering effect from the collateral damage of the large amount of explosive which is avoided in the present invention.

When the EW liner 200 wing extensions 225A and 225B are collapsed to horizontal plane 245 the jet energy is spread longitudinally forward and laterally outward over a larger spade shaped area parallel to and centered on horizontal plane 245, and upon target impact forms a plastic flowing region of jet and target material, that produces an elongated slotted hole that is parallel with horizontal plane 245 in the target material.

Since the liner wing extensions 225A and 225B are not connected or confined on the two opposing sides with parabolic faces 230A and 230B, the collapse of the liner wing extensions 225A and 225B material will spread in the direction of no confinement producing a flat spade shaped jet that stretches longitudinally on axis 237 and widens laterally on horizontal plane 245; somewhat like a linear shaped charge, but at a much higher velocity and directionally controlled by horizontal plane 245 orientation about axis 237. The liner wall 209 transition at vertical line 213 from the axisymmetric section B 222 portion of the EW liner 200 to the remaining axisymmetric and planar symmetric section C 233 is gradual so as to maintain jet continuity between the rod and spade portions of the jet.

Axisymmetric shaped charge liners come in cone, hemispherical, trumpet, and tulip shapes, included liner angles from 30 to 120 degrees and almost any base diameter within manufacture capability, the hybrid axisymmetric planar symmetric or Axi-Linear liner disclosure in this patent application intends to include this wide variety of profiles as part and parcel of the claims of this application.

For description purposes the Axi-Linear liner can be sectioned at vertical line 213 shown in FIGS. 3C, 3D and 3E with an aft full circumference conical section "B" 222, and forward partial circumference wing section "C" 233, the aft section B 222, being a full circumference of one of, or combination of the liner profiles, cone, tulip, trumpet, hemispherical, or other. HE detonation pressures on the full conical section B 222 produces an axisymmetric rod like stretching jet with mass, length, stretch rate, velocity, and time of flight of the jet proportional to the length, included angle A, and liner wall 209 thickness of section B 222; and on impact produces a deep round target material penetration.

The forward section C 233 consists of two less than full circumference liner walls 209 extending beyond the end of section B 222, creating partial conical or curved wing extensions 225A and 225B, wing vertices 232A and 232B and parabolic faces 230A and 230B that are symmetrically one hundred and eighty degrees apart. The wing vertex 232A and 232B and flat parabolic faces 230A and 230B are formed from the absence of material on two symmetrically opposing sides of the base end of the conical profile.

The wing extensions 225A and 225B create an axisymmetric and planar symmetric opposing partial radial hollow concavities on the inside liner wall surface 217 as viewed from horizontal plane 245; HE detonation pressures on these concavities provides a partial radial convergence and work into the liner material to cause it to rise in temperature and ductility causing plastic flow and hydrodynamic jetting. The outer surface of liner 200 along the winged extension 216 is shown in FIG. 2, while the outer surface of the liner 200 in the full conical section 234 is also shown in FIG. 2.

The collapse of the wing extensions 225A and 225B of section C 233 produces a wide planar symmetric stretching non round spade shaped jet which cuts a deep slot rather than a round hole; the mass, width, length, stretch rate, velocity, and time of flight of the spade jet is directly proportional to the liner wall length of section C 233, included angle A, and liner wall 209 thickness of section C 233. If section C 233 is shortened and the overall length "L" is unchanged section B 222 will become longer. Increasing the length of section B 222 will increase the rod jet length, mass and penetration depth, and will decrease the length, width, mass and penetration depth of the spade jet; length adjustments to sections B and C work in concert, when the rod jet is lengthened the spade jet will be shortened and vice versa shortening the rod jet will lengthen the spade jet.

FIG. 3D is a horizontal section view of EW liner 200 taken along line 2C-2C of FIG. 2B showing an elevated view of the inside liner surface 217, that further clarifies the profile of section B 222 with included angle A and section C 233 with wing width W. If width W increases and angle A and the overall length L is held constant the length of section C 233 and the extended wings will become shorter, the horizontal line 213 will move toward base end 220B and the length of section B 222 will become longer which will increase the length of the rod jet. Changing the length of section C 233 and section B 222 will change the length ratio of rod to spade jet. To improve the liner to HE mass ratio and rod jet performance liner wall thickness 209 may be held constant or can taper by increasing or decreasing the wall thickness 209 from apex 208 to wing vertex 232A and 232B.

FIG. 3E is a vertical section of EW liner taken along line 2D-2D of FIG. 2B showing an elevated view of the inside liner surface 217 and parabolic face 230A that further clarifies the profile of conical section B 222 and wing section C 233 with included angle A. Conical section B 222 and wing section C 233 have the same included angle A, and if angle A and the overall length L is held constant and the length of wing section C 233 increases, the vertical line 213 will move toward apex 208, which will increase the length of the spade jet and will decrease the length of the rod jet and vice versa if section C becomes shorter the spade jet length will decrease and the rod jet will increase. To improve the liner to HE mass ratio and spade jet performance, liner wall thickness 209 may be held constant or can taper by increasing or decreasing the wall thickness 209 from apex 208 to wing base end 220A and 220B.

The present invention uses shaped charge devices in the recovery of subsurface minerals and substances, which maximizes the development, production and capture of energy resources over traditional hydraulic fracturing (HF) techniques. The present invention and system reduces the steps in the perforating and fracturing operations of the mineral bearing formation compared to traditional methods, which reduces the operation time and costs incurred in the recovery, capture, production and delivery of energy resources. The present invention achieves those objectives by controlling the direction and distance of charge detonation around the well bore or well casing.

The present invention is a subterranean (non-hydraulic) shock fracturing system and process for fracturing oil and gas bearing formations, and the present invention delivers predetermined amounts of precisely placed explosive charges into the formation surrounding a bore hole or well casing. By precision controlling the delivery of predetermined explosive charges, the present invention makes possible a precision-controlled delivery of a measured quantity of explosive into a subterranean oil or gas bearing formation with the detonation of said explosive in order to fracture the formation in an intended and directionally controlled local vicinity.

The predetermined amounts of charges in the present invention produce large diameter deep penetrations into the formation; and, by coupling to the rock concussively fractures, the formation in the vicinity of this directionally and distance controlled explosive charge will increase permeability in a desired portion of the rock or formation strata. Secondary and tertiary charges can also be loaded and exploded using the present invention to increase the depth of the primary holes, enlarge the perforations, fracture the mineral bearing formation, and maximize the production, recovery and delivery of target resources from the formation. The ability to selectively "reshoot" lateral perforation holes into new wells (or underperforming old wells) with shaped charges using predetermined amounts of explosive will also improve formation communication, unlike current hydraulic fracturing (HF) methods or any previous efforts using large amounts of explosive.

Using the systems, techniques and methods in the present invention, operators now have the ability to enlarge perforation diameters, increase the explosive hole depths, control the direction of the explosive perforations, and increase energy recovery from the substrate formations, which greatly improves over existing hydraulic fracturing, rapid gas generation, and fracturing techniques. The present SFGS invention allows operators to perforate well bore casings with a series of individually contained primary shaped charge devices of predetermined explosive amounts, and then the present invention aligns and individually initiates a repeated succession of secondary and tertiary individually contained shaped charge devices in a series of common lateral formation holes in a controlled direction.

The Select Fire Gun System (SFGS) is composed of multiple segments, each containing a series of individual blast and containment chambers assembled in a long cylindrical arrangement, and each successive chamber contains a shaped charge or projectile (or set of same) that can be fired at with a predetermined explosive force (amount) in a controlled direction into the formation surrounding the borehole or well casing. The present invention uses this system of segmented select-fired multi-chambered shaped charge explosions to support repeated firings into perforation holes made by previously fired charges from the same SFGS system.

Figure 4:
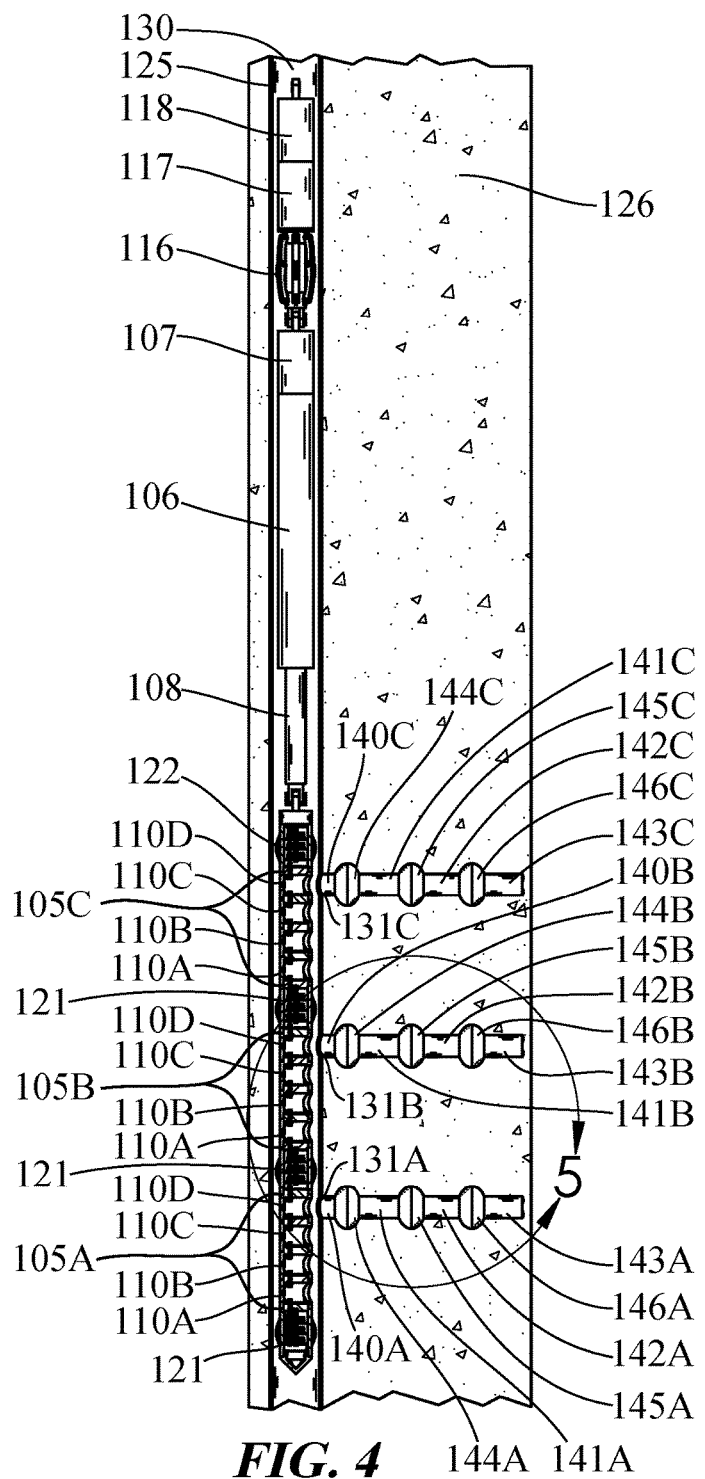
FIG. 4 is a longitudinal cross-section side view of the present invention in a subterranean well bore and formation after shaped charge detonations.

FIG. 4 is a cross-sectional view that shows the three lateral holes created in formation 126 by the sequential detonation of charges 115A-115D from each primary segment 105A, 105B, and 105C of the device 100 shown in the previous figures. The process starts with charge 115A from each segment 105A, 105B, and 105C of the SFGS assembly 100 being detonated in individual chambers 110A from each segment, forming a high speed stretching projectile (jet) that produces casing holes 131A, 131B, and 131C through well casing 125 and into formation 126 creating lateral holes 140A, 140B, and 140C in formation 126.

The SFGS assembly 100 is then repositioned by extending actuator rod 108 in a downward direction and rotationally until the chamber 110B containing charge 115B of each segment is aligned with casing holes 131A, 131B, or 131C previously made by charges 115A from each segment. After aligning with the lateral holes charge 115B of each segment can be initiated in chamber 110B, a super caliber shaped charge can be propelled through super-caliber holes 131A, 131B, or 131C in well casing to the bottom of the existing formation holes 140A, 140B, and 140C and detonated.

Detonation of charges within the existing formation holes deepens the holes and produces shock fracturing of the rock in the vicinity of the detonation, forming aneurisms 144A, 144B, and 144C with fracture lines that radiate outward in all directions, thereby increasing the lateral formation holes 141A, 141B, and 141C depth and permeability of that section of formation 126.

The SFGS assembly 100 is then repositioned by further extending and rotating actuator rod 108 in a downward (or upward) and radial direction until chamber 110C containing charge 115C of each segment is aligned with existing holes 131A, 131B, and 131C in casing made by charges 115A and 115B from each segment. After aligning with the lateral holes, charge 115C of each segment is then detonated and propelled through casing holes 131A, 131B, and 131C to the bottom of the existing holes 141A, 141B, and 141C in the formation and detonated thereby shock fracturing the rock in the vicinity of the detonation, forming aneurism 145A, 145B, and 145C further increasing the lateral holes depth 142A, 142B, and 142C and permeability of that section of formation 126.

The SFGS assembly 100 is then repositioned by further extending and rotating actuator rod 108 in a downward (or upward) and radial direction until the chamber 110D containing charge 115D of each segment is aligned with holes 131A, 131B, and 131C in casing 125 made by previously detonated charges 115A, 115B and 115C from each segment. After aligning with lateral holes, charge 115D of each segment is then propelled through casing holes 131A, 131B, and 131C to the bottom of the existing holes 142A, 142B, and 142C in the formation and detonated thereby shock fracturing the rock in the vicinity of the detonation, and forming aneurism 146A, 146B, and 146C and increasing the lateral holes depth 143A, 143B, and 143C and permeability of that section of formation 126.

Figure 5:
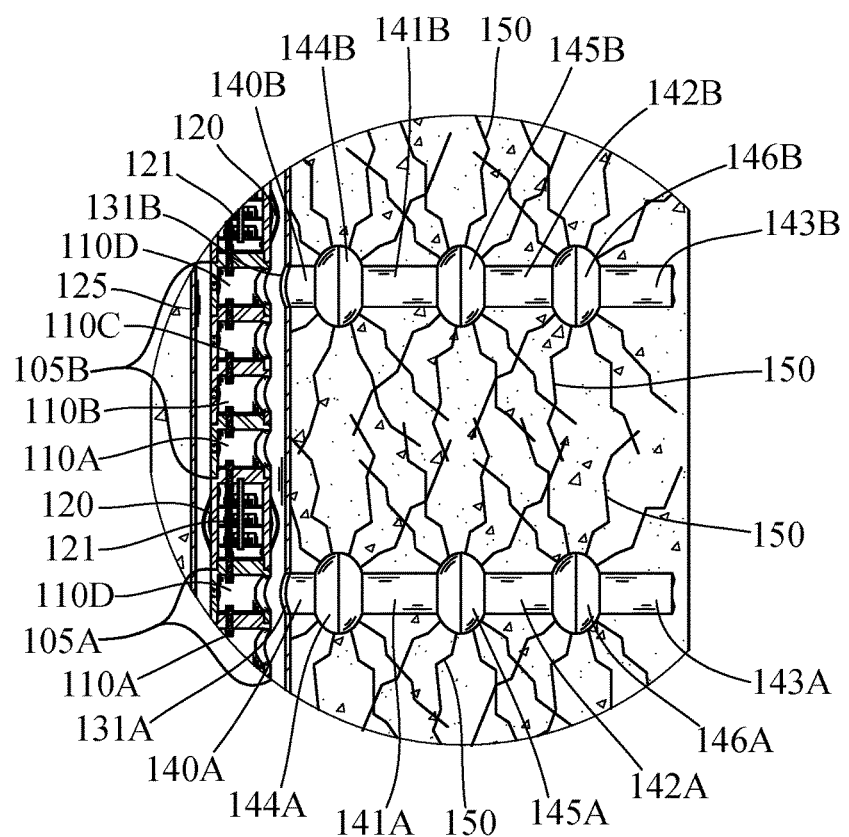
FIG. 5 is a an expanded longitudinal cross-sectional side view of the present invention along the expanded circle 5 in FIG. 4 further clarifying the construction of the blast chambers of the present invention and the formation fracturing after charge detonation.

FIG. 5 is a cross-sectional detailed view that further clarifies FIG. 4 (incorporating that description as well as description for FIGS. 1-3), of the lateral formation bore holes made by the shaped charges of primary sections 105A and 105B. FIG. 5 shows the formation fracture zones depicted by fracture lines 150 that fully encompass and radiate in all radial directions around aneurisms (charge detonation points) 144A, 145A, and 146A and the lateral holes 140A, 141A, and 142A made by primary section 105A charges; and around aneurisms (charge detonation points) 144B, 145B, and 146B and the lateral holes 140B, 141B, and 142B made by primary section 105B charges. The fracture zones fully encompass the lateral holes, with fracture lines crossing and connecting to adjacent holes fractures thereby forming a very large formation communication volume.

An important aspect of the present invention is the locking mechanism that locks the SFGS firing mechanism in the main borehole and ratchets the SFGS mechanism down or up the borehole or well casing and rotationally around inside the borehole or well casing so as to align new charges with existing lateral holes. The locking and alignment subsystems facilitate the depth, direction and distance control of shaped charges or explosives bearing projectiles to be propelled deep into the formation through the existing holes made by primary shaped charges and detonated at or near the hole created at the location of the previous shaped charge penetration.

The present invention method and system can be repeated many times, which allows for a greater lateral distance to be reached from the borehole in a controlled depth and distance in the borehole or well casing. Fracturing along and across natural formation planes can be accomplished using the present invention, which allows for the recovery and capture of a larger volume of the energy resources in a formation surrounding a borehole through a more thorough draining of the resource bearing formation as well as minimizing the flow of fluids along natural faults in the formation. Each time a charge is detonated outside the well casing, the detonation can be coupled to the formation so that it sends a shock wave through the formation, which allows operators to also seismically measure and read the shock waves in the well bore or at many locations around the main bore hole, which in turn allows operators to more precisely analyze many items of interest and more precisely determine the varying densities surrounding the borehole.

The present invention is far more efficient, precise and controlled than traditional hydraulic fracturing (HF) techniques because the present invention controls distance of explosive force, direction of the explosive force and depth of the explosive force in the borehole or well casing. The present invention increases permeability of the formation and increasing directional control of the concussive shattering of the rock around the epicenter of the detonation of the explosive charge deposited in the formation. The present invention is a mineral bearing formation fracturing system and process that eliminates separate steps in the traditional perforating and fracturing operations and reduces the steps in the fracturing operation, which achieves the objective of increasing production and cost efficiency of the energy recovery operations.

The present invention achieves the object of maximizing production, capture and delivery of energy resources from a formation surround a borehole or well casing by delivering a predetermined measured quantity of explosive into a subterranean oil or gas bearing formation, detonating said explosive at a controlled depth and direction, and fracturing the formation in the local vicinity of a resource deposit using directional, depth, and distance controlled charge explosions. The cost of the shock stimulation of a well is estimated to be about 80% less than hydraulic fracturing, and the present invention has a lower environmental impact than hydraulic fracturing. As an added benefit, the present invention relating to shock fracturing allows operators to secure the capture of seismic readings directly from the formation of interest.

The SFGS 100 can be equipped with many types of shaped charges, kinetic penetrators, and self-contained shaped charges or grenades. When using super caliber shaped charges the initial charge creates a lateral hole diameter in the casing and formation that is large enough for secondary and tertiary charges, of the same diameter, to be inserted into the lateral holes to deepen the hole and shock fracture the formation. Conventional perforating charges (that make holes much smaller than the charge diameter) can be used in the SFGS to increase perforation diameter and depth but follow on charges could not be inserted into the lateral perforations, because of the smaller than charge diameter hole produced in the casing and formation by conventional shaped charges. Many current conventional shaped charges, kinetic penetrators, grenades, and gas charges can be used alone or in conjunction with super caliber shaped charges in the SFGS system 100. The use of super caliber charges to make larger than charge diameter holes greatly improves the performance and capabilities of the present SFGS system.

FIG. 6-10 is an Axilinear shaped charge device used in the charge or blast assemblies for the SFGS assembly 100, which shows the orientation of the EW liner 305 wing extensions 325A and 325B in the 12 and 6 o'clock position with a vertical plane 346 and a horizontal wing collapse plane 345. An apex 308 with base ends 320A and 320B, liner wing extensions 325A and 325B, and wing base arc ends 321A and 321B toward the forward end of EW liner 300. The liner wing extensions 325A and 325B extend or protrude in a forward direction from section A beginning at wing vertex and ending at the base ends 320A and 320B.

Wing vertex is positioned longitudinally where the liner transitions from the full circumference conical section B into a partial circumference conical or other shape wing section C. Liner wall of section B and section C can vary in thickness, curvature, and included angle A can be increased or decreased to achieve desired rod and spade jet velocities and mass. The conical section B and wing section C 333 share a common longitudinal symmetrical axis, section C also has a horizontal collapse plane 345 in the 3 to 9 o'clock position and vertical plane 346 in the 12 to 6 o'clock position they are perpendicular to each other and intersect each other at symmetrical axis. Section B is axisymmetric or symmetrical about axis 337 in all radial planes for 360 degrees, whereas section C has two parabolic faces that are planar symmetric about vertical plane 346; and two extended wings 325A and 325B that are planar symmetric about horizontal plane 345 and also axisymmetric between the wing arc ends 321A and 321B about axis 337.

The EW liner 300 is a modified hollow cone, but could also be hemisphere, trumpet, tulip shapes, each having two opposing equal sections removed at the base end of the liner, creating two extended wings like 325A and 325B and two parabolic faces like 310F and 310F. The absence of the two opposing equal liner wall sections at the liner base end creates two equal 180 degree opposed liner wing extensions 325A and 325B or flutes. The included angle A of the hollow conical liner and the longitudinal length of the full section B portion of the liner determines the longitudinal wing length from wing vertex A to the base end 320A and 320B of the extended wings 325A and 325B or fluted portions of the liner and thusly the amount of the liner wall material that is dedicated to producing the spade or flattened portion of the jet.

The longitudinal length of section B and the extended wings 325A and 325B or flutes can be increased or decreased to achieve the desired ratio of rod to spade length of the jet created from EW liner 300. The thickness of the liner wall can gradually increase or decrease from the apex 308 to the base end 320A and 320B or anywhere along the wall length; a tapering liner wall thickness will help balance the liner to HE mass ratio as the liner cone diameter increases toward the base end 220A and 220B.

EW liner 305 has a liner wall thickness that can remain constant or gradually decrease in thickness from the aft apex 308 to the base end 320A and 320B. The charge body 310 has two flat faced parabolic sides 310F in the 9 and 3 o'clock position that have parabolic faces that geometrically match the EW liner 305 parabolic faces 330A and 330B, when coupled together these faces make a tight fitting body and liner coupling that supports the EW liner 305 wings and serves as containment for HE billet 315 along the partial circumference portion of EW liner 305. There is no HE or EW liner 305 material confinement laterally outside of the two parabolic sides 310F.

After the collapse of full conical section B by HE section B into a rod jet the curved wing-like extensions or flutes 325A and 325B of wing section C 333 are driven to horizontal plane 345 and symmetrical axis 337 of the EW liner 305 by the HE section C with wing explosive 340A and 340B, the colliding material forms a flat blade shape jet instead of a round jet because of the lack of liner material and HE confinement on the flat faced sides 310F that are ninety degrees out of phase from the wing-like extensions or flutes 325A and 325B.

The transition from conical section B to wing section C is gradual which allows the spade jet to stay connected to the forward rod jet as both portions of the jet stretch longitudinally forward along axis 337; and because of the lack of liner confinement on the two opposing parabolic faces 310F the spade jet will widen laterally on horizontal plane 345 as it stretches longitudinally forward with the forward rod jet. The body area 310D at the forward end of cylindrical section 310A that transitions from a cylindrical shape into two parallel flat parabolic faces 310F that are planar symmetric to each other and are coupled to the parabolic liner faces.

Figure 6:
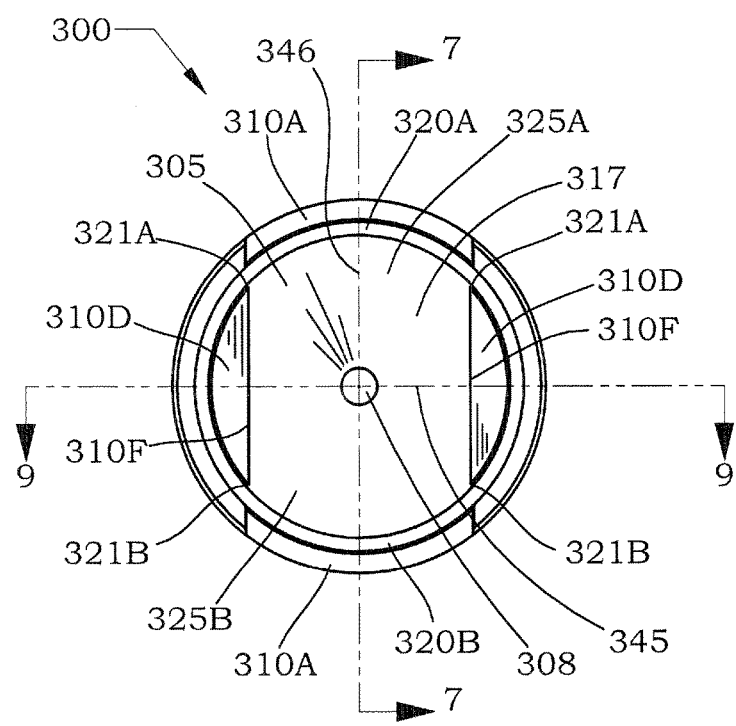
FIG. 6 is an end view of a shaped charge embodiment illustrating the liner wings in the 12 and 6 o'clock positions.

The lateral cross section of FIG. 6 along line 7-7 is coincident with Axilinear device 300 symmetrical axis 337, and extends perpendicular to the horizontal plane 345, which is also coincident with axis 337 and equidistant from the wing-like extensions or flutes 325A and 325B. EW liner 305 has a liner wall thickness that can remain constant or gradually decrease in thickness from the aft apex 308 to the base end 320A and 320B. The charge body 310 has two flat faced parabolic sides 310F in the 9 and 3 o'clock position that have parabolic faces that geometrically match the EW liner 305 parabolic faces 330A and 330B, when coupled together these faces make a tight fitting body and liner coupling that supports the EW liner 305 wings and serves as containment for HE billet 315 along the partial circumference portion of EW liner 305. There is no HE or EW liner 305 material confinement laterally outside of the two parabolic sides 310F.

As shown in FIG. 6-10, the Axilinear shaped charge device 300 consists of a body 310, EW liner 305, high explosive (HE) billet 315, having an axisymmetric aft area with detonator 336, detonator holder 335, detonation initiation point 307, and liner apex 308, and a axisymmetric as well as planar symmetric (Axilinear) fore area that consists of liner extended wings 325A and 325B and liner base ends 320A and 320B. Initiation of the HE billet of this novel device can be achieved by any suitable readily available detonation initiation devices.

Device 300 is axisymmetric or symmetrical about a longitudinal axis 337 from the aft end near detonator 336 to the middle liner wing vertex 332A and 332B of the EW liner 305; forward of wing vertex 332A and 332B device 300 is Axilinear with two symmetrical curved extended wings 325A and 325B being axisymmetric with axis 337 and also planar symmetric about two central perpendicular reference planes, a horizontal plane in the 3 and 9 o'clock positions, and a vertical plane in the 12 and 6 o'clock positions.

The Axilinear shaped charge device 300 is shown with a conical EW liner 305, other geometrical shaped (i.e. hemispherical, tulip, or trumpet) hollow cavity formed liners with extended liner wings can also be used. EW liner 305 has a full circumference axisymmetric conical profile section 322 with included angle A that is longitudinally between aft apex 308 and middle liner wing vertex 332A and 332B, and a Axilinear partial circumference wing section 333 toward the fore end with two symmetrically opposing conical fluted wing extensions 325a and 325B with included angle A that extend longitudinally from the middle liner wing vertex 332A and 332B to the forward liner base ends 320A and 320B.

The forward liner wing extensions 325A and 325B are symmetrical to each other and positioned one hundred and eighty degrees apart, opposing each other planar symmetrically about the horizontal plane and is axisymmetric about longitudinal axis 337 of the device. The absence of liner wall material on opposing sides of the wing section 333 at the forward base end of the liner forms two parabolic faces 330A and 330B that are parallel and symmetric with each other about longitudinal axis 337 and the vertical plane. Both liner parabolic faces 330A and 330B have a vertex at wing vertex 332A and 332B and open toward the base ends 320A and 320B with parabolic end points at the wing arc ends 321A and 321B.

EW liner 305 maintains its conical profile and liner wall 309 thickness profile from aft end apex 308 of the full circumference conical section 322 to wing vertex 332 and continues with the same profile to the fore end of the extended wings 325A and 325B at the base ends 320A and 320B of the partial circumference wing section 333. Liner wall 309 transitions from a full circumference conical profile at wing vertex 332A and 332 B into 180 degree symmetrically opposing wing like or fluted extensions 325A and 325B that extend from the full circumference conical profile section 322 at wing vertex 332A and 332B to the base end 320A and 320B of the liner.

The liner wing extensions 325A and 325B shown in FIG. 7 retain the same curvature, included angle A, and wall 309 thickness profile as the full conical profile section 322 portion of the liner; but the extended wings 325A and 325B could also have a larger or smaller included angle A and wall thickness 309 than the conical section 322, as long as they maintain planar symmetry to one another. Being planar symmetric and having partial circumference conical curvature allows the wing-like extensions or flutes 325A and 325B to converge at very high pressures on the collapse plane, raising the temperature and ductility of the converging wing material to the required level for Munroe jetting.

HE billet 315 can be pressed, cast or hand packed from any commercially available high order explosive. HE billet 315 is in intimate contact with the outer liner surface 316 of EW liner 305 from the aft apex 308 to the forward wing vertex 332A and 332B of the conical profile section 322 and from the wing vertex 332A and 332B to the base ends 320A and 320B and wing arc ends 321A and 321B of the wing section 333. HE billet 315 has three distinct sections, a head height or aft HE section "A" 338 as measured longitudinally between HE initiation point 307 and liner apex 308, a mid-section or full conic HE section "B" 339 as measured longitudinally from apex 308 to wing vertex 332A and 332B, that fully encompasses the liner conical section 322, and forward HE section "C" that contains two partial circumference wing HE sections 340A and 340B as measured longitudinally from wing vertex 332A and 332B to base ends 320A and 320B that conform to the shape of the liner wing extensions 325A and 325B.

HE section A 338 can be lengthened or shortened longitudinally by increasing or decreasing the length of body 310, greater head height gives a flatter detonation wave before it comes in contact with the liner. Flatter detonation waves at time of liner impact typically increase jet tip velocity and target penetration, head height optimization is a balance between jet performance and minimizing the explosive charge. The optimum head height can be determined by computer code and live testing to obtain the least amount HE volume needed to efficiently obtain maximum jet mass, velocity and target penetration. A typical head height for a conical lined shaped charge would be ½ inch space permitting.

The shape and volume of HE section B 339 is defined by the area between the inside surface 312 of body 310 and outside surface 316 of EW liner 305 from aft apex 308 to forward body face 310E located at wing vertex 332A and 332B, and makes a full circumference or revolution around liner section 322. The shape and volume of the two symmetrical wing HE sections 340A and 340B of HE section C 340 are defined by the area between the inside surface 312 of body 310 and outside surface 316 of EW liner 305 from aft wing vertex 332A and 332B to forward base ends 320A and 320B, and are partial circumference volumes about each wing between the wing arc end points 321A and 321B. HE billet 315 can have a super-caliber diameter (i.e. larger than the liner base diameter) necessary for full convergence of the base end of the liner wing extensions 325A and 325B to obtain maximum velocity and mass of the spade jet.

The forward section C 333 consists of two less than full circumference liner walls 309 extending beyond the end of section B 322, creating partial conical or curved wing extensions 325A and 325B, wing vertices 332A and 332B and parabolic faces 330A and 330B that are symmetrically one hundred and eighty degrees apart. The wing vertex 332A and 332B and flat parabolic faces 330A and 330B are formed from the absence of material on two symmetrically opposing sides of the base end of the conical profile. Wing arc ends 321A and 321B are parabolic end points on the forward edge of liner 305.

The wing extensions 325A and 325B create an axisymmetric and planar symmetric opposing partial radial hollow concavities on the inside liner wall surface 317; HE detonation pressures on these concavities provides a partial radial convergence and work into the liner material to cause it to rise in temperature and ductility causing plastic flow and hydrodynamic jetting.

The collapse of the wing extensions 325A and 325B of section C 333 produces a wide planar symmetric stretching non round spade shaped jet which cuts a deep slot rather than a round hole; the mass, width, length, stretch rate, velocity, and time of flight of the spade jet is directly proportional to the liner wall length of section C 333, included angle A, and liner wall 309 thickness of section C 333. If section C 333 is shortened and the overall length "L" is unchanged section B 322 will become longer. Increasing the length of section B 322 will increase the rod jet length, mass and penetration depth, and will decrease the length, width, mass and penetration depth of the spade jet; length adjustments to sections B and C work in concert, when the rod jet is lengthened the spade jet will be shortened and vice versa shortening the rod jet will lengthen the spade jet.

During collapse of the liner full conical section 322, liner material radially converges along the longitudinal axis 337 into a rod jet from the detonation of HE section A 338 and HE section B 339; the collapse of full conical section 322 is followed by the collapse of the extended liner wings 325A and 325B of the partial circumference section 333 into a spade jet from the detonation of wing HE sections 340A and 340B of HE section C. Wing HE sections 340A and 340B are coupled to the outer liner surface 316 of each wing from the aft wing vertex 332A and 332B to the forward wing base ends 320A and 320B and the wing arc ends 321A to 321B.

The radial curvature of the opposing liner wing extensions 325A and 325B provides the radial material convergence during collapse needed to raise the temperature and pressure of the collapsed liner material, to the required level for plastic flow and Monroe jetting to occur, this increases the ductility allowing for longer jet breakup length. During collapse the full conical section 322 of the liner will form an axisymmetric rod jet along the longitudinal axis 337 followed by the concave liner wing extensions 325A and 325B being driven to a common collapse plane by HE 340A and 340B, the colliding wing extensions material will form into a high velocity flat planar symmetric spade shape jet.

As the collapsed wing extensions material moves forward along longitudinal axis 337 it also spreads laterally outward forming the spade shaped jet along the horizontal collapse plane. The formation of the spade jet is due to the absence of liner material, explosive and confinement on the liner sides with the two flat parabolic faces 330A and 330B that are adjacent to and ninety degrees out of phase from the flutes or wing extensions 325A and 325B. The orientation of device 300 can be rotated about axis 337 and the spade jet orientation will rotate equally in the same direction, if device 300 is rotated 45 degrees clockwise about axis 337 the collapse plane will also rotate 45 degrees clockwise and the spade jet will stretch longitudinally forward on axis 337 and laterally along the rotated collapse plane.

The EW liner 305 is the working material of the shaped charge and is mounted to body 310 at the forward end of device 300, at the base ends 320A and 320B of the liner wing extensions 325A and 325B; and adjacent to the wings the liner parabolic faces 330A and 330B are mounted to the body 310 parabolic faces 310F. Body 310 consist of four distinct areas, a aft cylindrical area 310C that provides mounting for an initiation device that is coupled to the aft end of HE 315, followed by a boat tailed area 310B that contains the HE section A 338, followed by cylindrical area 310A that contains HE section B 339 that is coupled to the full conical liner section 322; and HE section C containing wing sections 340A and 304B that are coupled to the extended wings of liner section 333, and body area 310D at the forward end of cylindrical section 310A that transitions from a cylindrical shape into two parallel flat parabolic faces 310F that are planar symmetric to each other and are coupled to the parabolic liner faces 330A and 330B.

Body area 310D has two functions, it provides two opposing side mounting faces 310F for the liner extended wings and also has flat faces 310E that is the forward containment boundary of HE section 339; this boundary is located at wing vertex 332A and 332B, and is also the liner wing transition point from the full circumference conical section 322 to the extended wing section 333. The containment of HE pressures during the detonation time period by body area 310D is important for proper collapse of the wings and spade jet formation. Shape charge liners for the most part are made from copper but liners may be made from most any metal, ceramic, powdered metals, tungsten, silver, copper, glass or combination of many materials. Body 310 would typically be made from aluminum or steel but could be made of almost any metal or plastic as long as it provides the correct amount of tamping for proper jet formation and desired jet velocity during the detonation of HE billet 315.

The EW liner 305 is a modified cone or other shape with two distinct geometrical sections, the aft end of the liner is a full conical profile section 322 with an apex 308, followed by the forward end wing section 333 with two liner wing extensions 325A and 325B that extend forward from the full conical or other shape profile section 322 at wing vertex 332A and 332B to the wing base ends 320A and 320B at the fore end of EW liner 305. The liner wing extensions 325A and 325B maintain the same included angle A liner wall 309 thickness profile and curvature of the full conical profile section 322.

The included angle A of EW liner 305 needed to obtain Munroe effect jetting should be from 36 to 120 degrees. The jet velocity achieved from a shaped charge is dependent on the liner wall 309 thickness and included angle A of the liner; a narrower included angle results in a faster less massive jet, and a wider included angle results in a slower more massive jet. Jet velocities can vary from 4 to 10 km/s depending on the type and quality of liner material, included angle A of the liner, liner wall 309 thickness, the charge to mass ratio of HE to liner, bulk density of the liner, surface finish of the liner wall, and body geometries; very small changes of any of these variables can make large differences in jet velocity and trajectory.

The HE billet 315 is contained between the inner surface 312 of body 310 and the outer surface 316 of the EW liner 305. HE billet 315 provides the energy to collapse the EW liner 305, increasing the ductility of the EW liner 305 material, causing it to form a compound jet in the shape of a very high speed rod jet from the full conical section 322 material followed by a flattened spade shaped jet from the liner wing section 333 material; the spade jet is slower than the rod jet from conical section 322 but much faster than a typical "V" shaped liner found in common linear shaped charge because of the cavity of the wing section 333.

Body 310 provides a mounting surface for EW liner 305 which is held to body 310 at the liner base ends 320A and 320B and at the parabolic faces 330A and 330B. The base end of EW liner 305 does not form a full circumference; it consists of two opposing concave surfaces or wing extensions 325A and 325B and the corresponding wing base ends 320A and 320B at the forward end of the liner. Body 310 also serves as a containment vessel for the delicate HE billet 315 and protects it from damage or impact by supporting the outer diameter of HE billet 315. Body 310 also provides tamping for the HE billet 315 depending on body wall 306 thickness and material density, HE tamping can be increased or decreased if needed to improve jet performance or reduce total HE mass.

The purpose of removing the base end material on symmetrically opposing sides of EW liner 305 and creating the wing-like extensions 325A and 325B is twofold. The first purpose is to form the partial circumference conical wing-like extensions or flutes 325A and 325B and when collapsed converge to form the flat aft spade shaped portion of the jet; the flattened spade jet spreads laterally and erodes an elongated slot in target material. The second purpose being to allow for close lateral proximity of multiple adjacent devices resulting in multiple tightly spaced rod and intersecting spade jet perforations, creating a large coupled slotted target perforation.

Since the EW liner 305 material is not being confined along the two removed portions of the liner at parabolic faces 330A and 330B, the collapse of the wing-like extensions or flutes 325A and 325B will produce a flat jet, much like a linear shaped charge, but at a much higher velocity, stretching laterally and longitudinally. The transition from the conical profile section 322 to the remaining wing-like extensions or flutes 325A and 325B of EW liner 305 is very gradual so as to maintain continuity between the rod and spade portions of the jet.

The shaped charge body 310 has a frustoconical or boat tailed portion 310B near the aft end of the shaped charge device 300 that begins at detonator holder 335 and increases in diameter longitudinally to about the apex 308 of EW liner 305. The cylindrical portion 310A of the body 310 begins at about the apex 308 of the EW liner 305 and extends longitudinally to the forward end of device 300. The forward end of cylindrical portion 310A has two planar symmetrical 310D portions, each with a cylindrical outer face 310G, an inner parabolic flat face 310F and internal flat face 310E. The two internal parabolic flat faces 310F of the body begin at the liner wing vertex 332A and 332B and end at wing arc ends 321A and 321B; faces 310F are symmetrical and parallel to each other, and perpendicular with the wing collapse plane that is centrally located and collinear with longitudinal axis 337 between the two flat faces 310F.

Flat faces 310F and faces 310E of the shaped charge body 310D help confine the wing HE 340A and 340B portion of HE billet 315 by providing cavity closure between the flat faces 310F and the liner parabolic faces 330A and 330B on each side of the wing-like extensions or flutes 325A and 325B of the EW liner 305. The body 310 preferably tapers or boat tails smaller in some manner toward the rearward end 310B from aft of the liner apex 308 toward the detonator holder 335 minimizing the overall mass of HE billet 315, reducing the amount of explosive by boat tailing body 310 increases the charge efficiency without affecting the liner collapse performance, and reduces unwanted collateral target damage from excessive explosive mass.

The invention described and depicted herein produces a two part stretching jet, the forward portion is a rod like asymmetric jet and the aft portion is spread into a sheet like planar symmetric shape reminiscent of the jetting of a linear shaped charge. In order to achieve the greatest jet length and penetration depth the jetting process of a shaped charge requires the liner material to reach a high temperature during collapse, which allows plastic flow of the collapsed liner material and produces a long stretching jet. Since jet length and penetration are directly proportional it is reasonable to make the greatest effort to provide the longest and most robust jet possible.

The above description of the directions of the shaped charge body and liner can be reversed whereby the axisymmetric jet is aft of the spade jet, there can be multiple sections alternating from axisymmetric and planar symmetric sections that produce alternating spade rod spade rod jet. The sections making up a liner do not have to have the same internal angle, thickness profile or material. The internal angles of these sections can vary from 36 degrees to 120 degrees and still produce Munroe jetting, that is to say a ductile jet having a velocity gradient from tip to tail. The arc length of each wing as encompassed by radial lines radiating from the central axis and intersecting each cord end of the arc of the wing can vary from 90 to 140 degrees.

An apex 308 toward the aft end of the full circumference conical section "B" 322, and a partial circumference wing section "C" 333 with base ends 320A and 320B, liner wing extensions 325A and 325B, and wing base arc ends 321A and 321B toward the forward end of EW liner 300. The liner wing extensions 325A and 325B extend or protrude in a forward direction from section A 322 beginning at wing vertex 332A and 332B and ending at the base ends 320A and 320B. Wing vertex 332A and 332B are positioned longitudinally at vertical line 313 where the liner transitions from the full circumference conical section B 322 into a partial circumference conical or other shape wing section C 333. Liner wall 309 of section B 322 and section C 333 can vary in thickness, curvature, and included angle A can be increased or decreased to achieve desired rod and spade jet velocities and mass.

The conical section B 322 and wing section C 333 share a common longitudinal symmetrical axis 337, section C 333 also has a horizontal collapse plane 345 in the 3 to 9 o'clock position and vertical plane 346 in the 12 to 6 o'clock position they are perpendicular to each other and intersect each other at symmetrical axis 337. Section B 322 is axisymmetric or symmetrical about axis 337 in all radial planes for 360 degrees, whereas section C 333 has two parabolic faces 330A and 330B that are planar symmetric about vertical plane 346; and two extended wings 325A and 325B that are planar symmetric about horizontal plane 345 and also axisymmetric between the wing arc ends 321A and 321B about axis 337. The EW liner 300 is a modified hollow cone, but could also be other relative hollow shapes (i.e. hemisphere, trumpet, tulip), having two opposing equal sections removed at the base end of the liner, creating two extended wings like 325A and 325B and two parabolic faces like 330A and 330B.

The absence of the two opposing equal liner wall sections at the liner base end creates two equal 180 degree opposed liner wing extensions 325A and 325B or flutes. The included angle A of the hollow conical liner and the longitudinal length of the full section B 322 portion of the liner determines the longitudinal wing length from wing vertex 332A and 332B to the base end 320A and 320B of the extended wings 325A and 325B or fluted portions of the liner and thusly the amount of the liner wall 309 material that is dedicated to producing the spade or flattened portion of the jet. The longitudinal length of section B 322 and the extended wings 325A and 325B or flutes can be increased or decreased to achieve the desired ratio of rod to spade length of the jet created from EW liner 300. The thickness of the liner wall 309 can gradually increase or decrease from the apex 308 to the base end 320A and 320B or anywhere along the wall length; a tapering liner wall 309 thickness will help balance the liner to HE mass ratio as the liner cone diameter increases toward the base end 320A and 320B.

After the collapse of full conical section B 322 by HE section B into a rod jet the curved wing-like extensions or flutes 325A and 325B of wing section C 333 are driven to horizontal plane 345 and symmetrical axis 337 of the EW liner 305 by the HE section C with wing explosive 340A and 340B, the colliding material forms a flat blade shape jet instead of a round jet because of the lack of liner material and HE confinement on the flat faced sides 310F that are ninety degrees out of phase from the wing-like extensions or flutes 325A and 325B. The transition from conical section B 322 to wing section C 333 is gradual which allows the spade jet to stay connected to the forward rod jet as both portions of the jet stretch longitudinally forward along axis 337; and because of the lack of liner confinement on the two opposing parabolic faces 310F the spade jet will widen laterally on horizontal plane 345 as it stretches longitudinally forward with the forward rod jet.

The horizontal plane 345 of the wing section C 333 is seen as a horizontal longitudinal line that is coincident with symmetrical axis 337 in FIGS. 7 and 9. Horizontal plane 345 is where the liner material of the two 180 degree opposing extended axisymmetric and planar symmetric wing extensions 325A and 325B of EW liner 305 will converge from the detonation pressures of HE section C with wing explosive 340A and 340B forming the spade jet 342 shown in FIGS. 8 and 10. Horizontal plane 345 also represents the orientation and direction of the wide lateral cross-section of spade jet 342, which are coplanar and coincident to each other. The liner wing extensions 325 and the view of jet 301 are correctly oriented to each other to represent the collapse of the EW liner 305 from this viewpoint, the spade jet 342 is seen as a thin section along symmetrical axis 337 and horizontal plane 345 that decreases in thickness from the aft end spade jet tail 349 to the forward end rod/spade transition point 348 where it is connected to the aft end of rod jet 343. Jet 301 would form within the hollow cavity of EW liner 305 of device 300 and at some time after liner collapse would eventually stretch past the base end 325A and 325B, it is shown in FIG. 5 fully outside of and to the right of the device for easier viewing.

Body 310 contains and protects HE billet 315 and provides a mounting surface for EW liner 305 at its base ends 320A and 320B. The HE billet 315 detonation is initiated by any suitable commercially available detonator 336 on the device symmetrical axis 337 at initiation point 307. With respect to the longitudinal symmetrical axis 337 of device 300, the liner full circumference conical section B 322 is aft of wing vertex 332A and the liner wing section C 333 is forward of the wing vertex 332A. The jet 301 produced by device 300 has three distinct regions and shapes; a high velocity 7-9 km/s round axisymmetric rod jet 343 with forward jet tip 344 and aft rod/spade jet transition point 348, followed by a lower velocity 4-7 km/s planar symmetric flattened spade jet 342 mid-section and jet tail 349, followed by the slug separation area 347 and a low velocity ½ km/s slug 350.

The forward axisymmetric rod jet 343 in FIG. 5 is formed from the conical section B 322 of EW liner 305 that starts at apex 308 and ends at the wing vertex 332A of the parabolic flat face 330A. At wing vertex 332A the conical section B 322 of the liner transitions into the wing section C 333 with two opposing concave liner wing extensions 325A and 325B or flutes, formed due to the liner side truncation. The aft spade jet 342 is formed from the collapse of the liner wing section C 333 opposing liner wing extensions 325A and 325B portions of EW liner 305. The aft spade jet 342 being flat and wide, similar to a conventional linear shaped charge jet but more massive, directionally controllable and at a much higher velocity, thus the Axilinear name. The amount of liner material designated to the aft and forward portions of the combination spade and rod jet can be adjusted by shortening or lengthening conical section B 322 and wing section C 333 of EW liner 305 to give differing lengths and widths of rod and spade shaped jet sections.

In FIGS. 8 and 10, the jet 301 consists of an aft slug 350, spade jet tail 349, spade jet 342, rod/spade jet transition point 348, rod jet 343, and forward jet tip 344. Jet and slug velocities, angle of projection, thickness, spade blade width and length of both jet sections can vary depending on device 300 design. The forward longitudinal velocity of jet 301 is greatest at jet tip 344 and has a velocity gradient from the forward end jet tip 344 to the aft end spade jet tail 349. Jet 301 velocity and the velocity gradient are factors of device design, type of explosive, and the type of material used to make EW liner 305. Amongst many other design factors of device reducing the liner included angle A will increase jet velocity and the velocity gradient. The jet velocity gradient and material ductility directly affects the stretch rate of jet 301 and ultimately the length and width of both the rod jet 343 and spade jet 342 portions of jet 301, higher velocity gradients will result in a thinner and longer jet. This depiction of the jet is at a finite time after the detonation of device. The jet at an earlier time frame after detonation of HE billet 315 would be shorter in length and thicker, at a later time it would have stretched forward becoming longer and thinner because of the velocity gradient and ductile stretching of the EW liner 305 material.

The longitudinal depiction of jet 301 in FIGS. 8 and 10 has the forward jet tip 344 and rod jet 343 on the right hand side of aft spade jet 342 with a middle jet transition point 348. The jet transition point 348 is where the material contributed to rod jet 343 from the collapse of the conical section B ends and the spade jet 342 material contributed by the collapse of wing section C 333 begins. The FIGS. 8 and 10 jet orientation is an edge view of spade jet 342 and collapse plane 345 which is the thinnest cross-section of the spade and the result of the liner wings 325A and 325B of FIG. 3 being in the 6 and 12 o'clock positions. The spade portion of jet 301 in FIG. 5 is slightly thicker at the aft end jet tail 349 with a thinning cross-section toward the foreword end jet transition point 348 this is due to stretching from a higher velocity forward end, matching the rod jet thickness due to the longitudinal jet stretch rate.

The jet 301 is formed from the collapse of EW liner 305 caused by a detonation shock wave and converging pressure toward symmetrical axis 337 from detonating HE billet 315, that is traveling longitudinally from aft HE initiation point 307 to forward base ends 320A and 320B of device. As the detonation wave created from detonating HE billet 315 progresses from the aft end HE section A 338 forward to HE section B 339 of device it first collapses the section B of EW liner 305 starting at apex 308 and continuing forward to vertex 332A and 332B creating the rod jet 343 portion of jet 301, the collapse and jetting from section B of the liner resembles that of a typical axisymmetric conical lined shaped charge. As the detonation wave moves forward of wing vertex 332A and 332B the HE section C wing explosive 340A and 340B collapse the extended wings 325A and 325B of section C 333 starting at vertex 332A and 332B and ending at base end 320A and 320B forming the spade jet 342 portion of jet 301. Both rod and spade portions of jet 301 stretch and elongate longitudinally forward along axis 337 and spade portion 342 also widens laterally on plane 345; as time progresses after initial detonation and collapse of EW liner 305, and at some elongation length and time after collapse the higher velocity rod and spade jet will break free of the collapsed liner mass. The remaining liner mass becomes a lower velocity slug 350 represented by slug separation area 347.

Figure 11:
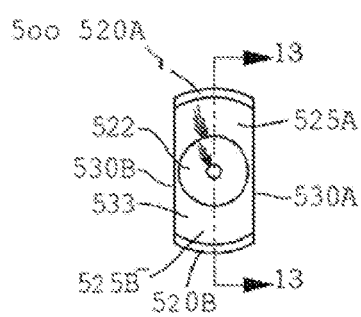
FIG. 11-13 is a diverging wing variation of the liner embodiment shown in FIG. 2.
Figure 12:
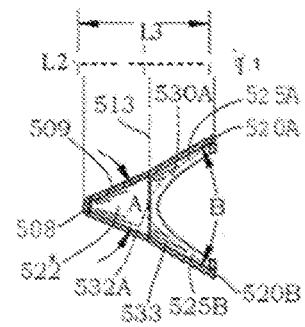
Figure 13:
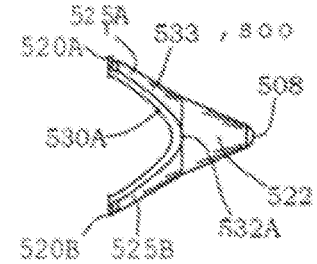

FIGS. 11, 12, 13, 14, 15, and 16 show some possible variations of the Axilinear liner embodiment that can be implemented in the SFGS assembly 100 to modify the spade jet width, length, velocity and mass. FIG. 11 is a base end view of EW liner 500 a diverging variation with diverging extended wings. FIG. 12 is a vertical sectional view taken along line 13-13 of FIG. 11 illustrating the diverging extended wings 525A and 525B with an included angle B of the partial circumference wing section 533 being greater than included angle A of the full circumference conical section 522. FIG. 13 further clarifies the construction of the diverging EW liner 500. EW Linear 500 has all the main features and characteristics of the FIG. 2 embodiment with the addition of a diverging wing section 533 that has a included angle B wider than the conical section 522 included angle A.

EW Linear 500 has a full conical section 522 with an aft apex 508, included angle A, conical length L2 and forward wing apex 532A at vertical line 513. Namely, EW Liner 501 has a full conical section 522 with an aft apex 508, included angle A, conical length L2 and forward wing apex 532A at vertical line 513. Wing section 533 begins at vertical line 513 with two extended wings 525A and 525B protruding forward, flat parabolic faces 530A and 530B, wing length L1, and forward base ends 520A and 520B.

The liner wall 509 transition at radial line 513 from the aft axisymmetric conical section 522 portion of the EW liner 500 to the remaining forward axisymmetric and planar symmetric wing section 533 is a gradual transition of the two sections at radial line 513 so as to maintain jet continuity between the rod and spade jets. The purpose of diverging wings is to decrease the velocity of the spade portion of the jet and increase its mass. EW liner 500 wings included angle B can be between 30 and 120 degrees and still produce viable spade jetting.

Figure 14:
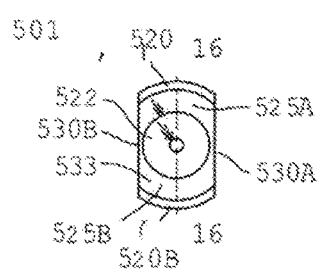
FIG. 14-16 is a converging wing variation of the liner embodiment shown in FIG. 2.
Figure 15:
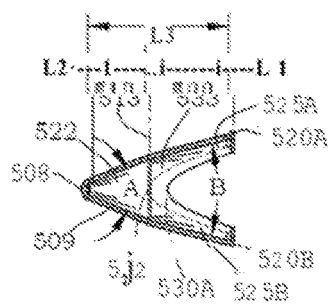
Figure 16:
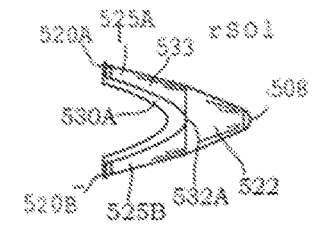
Figure 18:
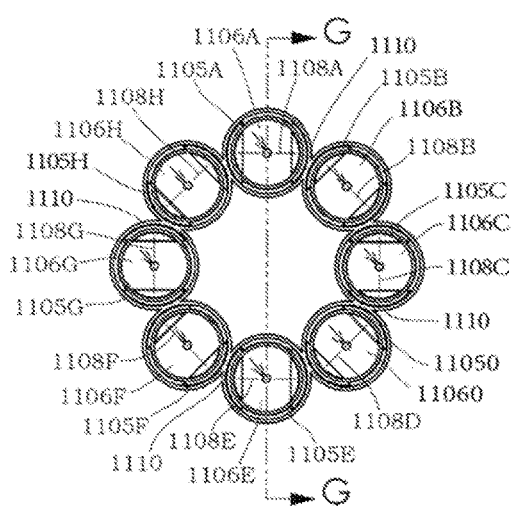
FIG. 18 is a front view of the embodiment shown in FIG. 17.

FIGS. 14, 15, and 18 illustrate a EW liner 501 variation with converging extended wings 525A and 525B with an section 533 with an included angle B less than included angle A of conical section 522. FIG. 14 is a base end view of the EW liner 501 converging variation with converging extended wings 525A and 525B. FIG. 15 is a vertical sectional view taken along line 16-16 of FIG. 14 illustrating the converging extended wings 525A and 525B with an included angle B of the partial circumference wing section 533 being less than included angle A of the full circumference conical section 522. FIG. 16 further clarifies the construction of the converging EW liner 501.

EW Liner 501 has all the main features and characteristics of the FIG. 2 embodiment except having a narrower included angle B of a converging wing section 533 than the conical section 522 included angle A. Namely, EW Liner 501 has a full conical section 522 with an aft apex 508, included angle A, conical length L2 and forward wing apex 532A at vertical line 513. Wing section 533 begins at vertical line 513 with two extended wings 525A and 525B protruding forward, flat parabolic faces 530A and 530B, wing length L1, and forward base ends 520A and 520B.

The liner wall 509 transition at vertical line 513 from the aft axisymmetric conical section 522 portion of the EW liner 501 to the remaining forward axisymmetric and planar symmetric wing section 533 is a gradual transition of the two sections at radial line 513 so as to maintain jet continuity between the rod and spade jets. The purpose of diverging wings is to increase the velocity of the spade portion of the jet and decrease its mass. EW liner 501 wings included angle B can be between 30 and 120 degrees and still produce viable spade jetting.

Figure 17:
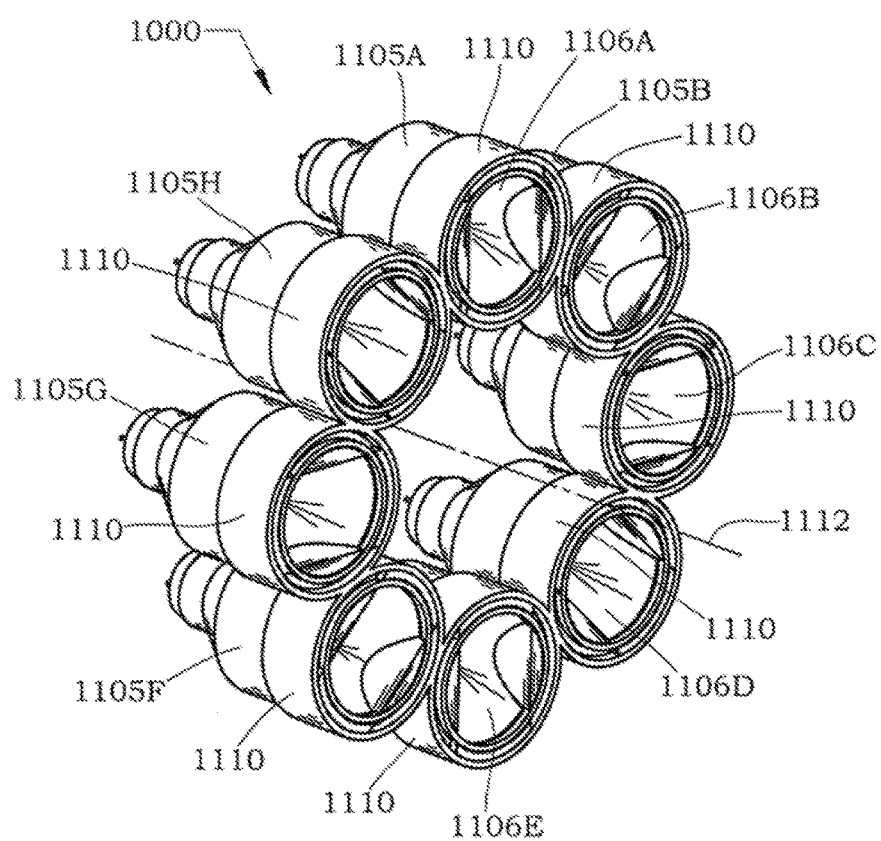
FIG. 17 is a perspective view of a circular array of eight Axilinear shaped charge devices.
Figure 19:
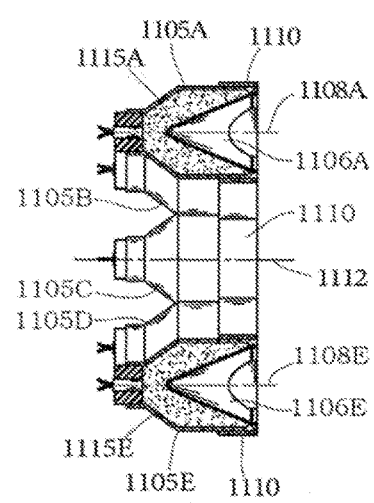
FIG. 19 is a longitudinal sectional view along line G-G in FIG. 18.

FIG. 17-19 show a circular Axilinear device array 1000 of eight individual Axilinear shaped charge devices 1105A-1105H that can be used in SFGS assembly 100, which are held together by a rigid retaining structure 1110 around the array axis of symmetry 1112. Each individual Axilinear shaped charge device 1105A-1105H can be configured in a manner where each shaped charge means an explosive device, having a shaped liner, driven by a similarly shaped mating explosive billet, having an initiation device, the necessary containment, confinement and retention of the liner to the explosive billet. The result of detonation of this device is a high speed stream of material produced from the convergence of the liner driven by the explosive.

The EW liner 1106A-H is the working material of the shaped charge and is mounted to shape charge unit 1105A-H at the forward end of device 1000, at the base ends of the liner wing extensions as shown in FIG. 1 (and related figures); and adjacent to the wings the liner parabolic faces are mounted to the shape charge units 1105A-H at the parabolic faces. Each shape charge unit 1105A-H in the array 1000 consists of four distinct areas, a aft cylindrical area that provides mounting for an initiation device that is coupled to the aft end of HE, followed by a boat tailed area that contains the HE section A, followed by cylindrical area that contains HE section B that is coupled to the full conical liner section; and HE section C containing wing sections that are coupled to the extended wings of liner section, and body area 1105A-H at the forward end of cylindrical section that transitions from a cylindrical shape into two parallel flat parabolic faces that are planar symmetric to each other and are coupled to the parabolic liner faces, which are all features shown and described in FIG. 1 (and related figures).

Figure 20:
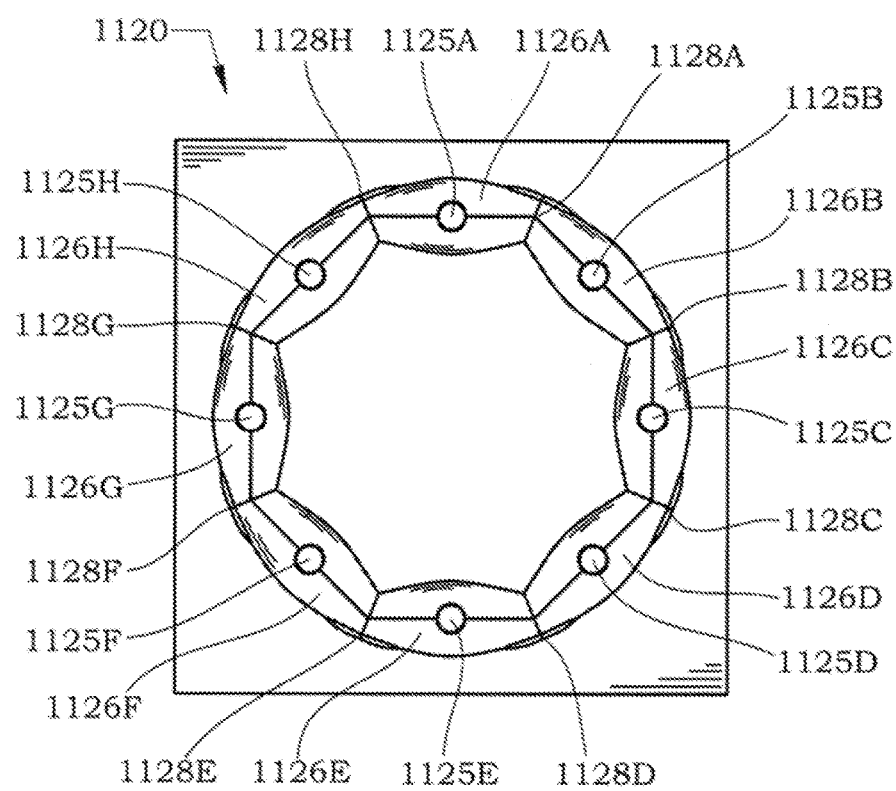
FIG. 20 is an illustrated view of a target surface with a ring of cavities created by the detonation and the resultant jetting of the embodiment shown in FIG. 17.

The rigid retaining structure 1110 surrounds and secures the shaped charge devices 1105A-H to the array 1000 around the array axis of symmetry 1112 (shown in FIGS. 17 and 19). When equally spaced Axilinear devices are configured in a radial array with their collapse planes 1108A-1108H being normally aligned around a common symmetrical axis 1112 as depicted in FIG. 18 and FIG. 19, simultaneous detonation of the shape charges 1105A-H in the array 1000 will produce a series of connecting penetrations forming a large circle penetration 1120 as illustrated in FIG. 20.

The array 1000 of Axilinear devices 1105A-1105H achieves this super caliber hole by having a liner that has a aft axisymmetric full of conical section and a forward liner section that transitions into a series of opposing concave flutes in a periphery configuration such as a circle or other polygonal shape. The fluted extended wing (EW) liners 1106A-1106H wing extensions are planer symmetric and axisymmetric having partial circumference directly opposed wings at the base end of the liner, and have sufficient curvature to converge the liner material into spade shaped jets in a radial pattern about planes 1108A-1108H, allowing a circular or other shaped array of liner wing extensions to produce multiple connected cavities of almost any shape or length. The axisymmetric and planer symmetric liner wing extensions and the high explosive driving them increases the temperature and ductility of the liner material improving the performance of the device.

In the circular Axilinear array 1000 configuration, the linear flattened spade portions of the jets connect at overlap points 1128A-1128H and combine to form a closed large diameter hollow body roughly resembling a hollow cylinder. The forward rod portion of each jet erodes deep holes 1125A-1125H in the target followed by elongated holes 1126A-1126H created by the flattened spade portion of the jet that connect at overlap points 1128A-1128H; the array of spade jets erodes and removes the target material between the rod jet holes creating a large connected cavity. When put in a circular or other patterned array, the Axilinear shaped charges will produce deep and extremely large diameter holes greater than the overall device diameter of the array without leaving a center core plug of material in the target. When very large perimeter holes are desired multiple concentric rings of arrays can be used to remove all of the center target material with no core material left behind.

FIG. 18 illustrates the orientation of the Axilinear shaped charge devices 1105A-1105H and the EW liner 1106A-1106H wing collapse planes 1108A-1108H of each device of the FIG. 17 embodiment. The collapse planes 1108A and 1108E of devices 1105A and 1105E are perpendicular to line G-G and all eight devices 1105A-1105H in this array are oriented the same with symmetrical axis 1112 of the array. Other variations of arrays could have the collapse planes of the individual devices at any orientation or angle with the symmetrical axis and each other.

FIG. 19 is a cut-away view of the longitudinal section view along line G-G of the FIG. 18 circular array that further explains the direction and orientation of the collapse planes 1108A-1108H of the Axilinear devices 1105A-1105H and the EW liners 1106A-1106H with axis 1112 of the FIG. 17 embodiment. The FIG. 19 section view of device 1105A and 1106E shows a side view of the sectioned liner wings of wing liner 1106A and 1106E and a side end view point of collapse plane 1108A and 1108E.

As shown in FIG. 19, the HE billet 1115A and 1115E can be pressed, cast or hand packed from any commercially available high order explosive. HE billet 1115A, E is in intimate contact with the outer liner surface of EW liner 1105A-E from the aft apex to the forward wing vertex of the conical profile section and from the wing vertex to the base ends and wing arc ends of the wing section. The rigid retaining structure 1110 surrounds and secures the shaped charge devices 1105A-E to the array 1000 around the array axis of symmetry 1112 (shown in FIGS. 17 and 19).

HE billet 1115A,E has three distinct sections, a head height or aft HE section "A" as measured longitudinally between HE initiation point and liner apex, a mid-section or full conic HE section "B" as measured longitudinally from apex to wing vertex, that fully encompasses the liner conical section, and forward HE section "C" that contains two partial circumference wing HE sections and 140B as measured longitudinally from wing vertex to base ends that conform to the shape of the liner wing extensions. All the above features of HE billet 1115A,E described herein are shown and described in more detail with respect to FIG. 1 and related figures.

Detonating the high explosive billet 1115 in each of the Axilinear shaped charges 1105A-1105H collapses the EW liners 1106A-1106H and produces a combination of a forward central longitudinal rod shaped jet followed by a aft flattened spade shaped jet about collapse planes 1108A-1108H, somewhat like a linear shaped charge, but at much higher velocities with "Munroe" jetting and having a much larger velocity gradient than that of a linear shaped charge. The conical aft liner portion creates the rod shaped jet while the fluted forward liner wing portion creates the sheet-like spade shaped jet.

Axilinear charges 1105A-1105H in the array 1000 are detonated in concert forming a simultaneous ring of jets that erodes the circular cavity 1120 shown in FIG. 20. The aft portion of the jets produced by devices 1105A-1105H are spade shaped and when combined edge to edge will produce a ring of connected deep elongated slotted holes 1126A-1126H removing the target material at jet overlap point 1128A-1128H between the series of deeper round hole perforations 1125A-1125H made by the rod like forward portion of the Axilinear jets. In this configuration a super caliber hole larger than the major diameter of the shaped charge array will result from the interaction of the spade portion of the Axilinear jets with the target.

The orientation or direction of the elongated holes 1126A-1126H are controlled by the Axilinear device collapse planes 1108A-1108H orientation when placed in the rigid support structure 1110 of array 1000. By rotating the collapse planes 1108A-1108H with respect to axis 1112, the same rotation of the slotted holes 1126A-1126H in the target will result. With correct standoff and spacing between array segments, the Axilinear shaped charges 1105A-H will produce a combination of high velocity stretching jets and deep hydrodynamic circular slotted penetrations that connect at 1128A-1128H to form a full ring penetration of almost any diameter. The ring cavity 1120 shown in FIG. 20. is what should be expected if the target material was a metal or other material with properties similar to metal, much larger super caliber array diameter holes with no center material left behind and with many surrounding fractures would be expected in a masonry or rock like material.

In the continuing effort to produce full or super caliber deep holes using shaped charges it is necessary to reshape the energy delivery to the target in a different pattern than that of an axisymmetric shaped charge. Since axisymmetric shaped charges produce very small diameter holes in comparison to the diameter of the shaped charge it is necessary that the jet energy must be applied to a larger target surface area to produce a full caliber large volume hole. A full caliber hole in the context of a shaped charge array means a hole as large as or larger than the outer diameter of the array of Axilinear jet producing devices.

The jet produced by each Axilinear shaped charge has an axisymmetric forward rod portion that transitions into a flattened planer symmetric aft portion somewhat like a linear shaped charge thus termed Axilinear shaped charge. The Axilinear shaped charges can be deployed individually and will produce an elongated hole with length of the hole as wide as or wider than the diameter of the charge itself and when combined into a circular or other shaped array they will produce very large holes or splined cuts.

Each Axilinear shaped charge 1105A-1105H or component in the array 1000 configuration can be aimed at different angles relative to the array longitudinal axis 1112 and to each other. Further, this Axilinear array 1100 can produce super caliber holes; an array of these arrays could produce extremely large holes even in the multi foot diameter range. This would give an adjustable spray pattern for larger area coverage such as attacking convoys or any massed assembly of troops or vehicles. Arrays of multiple Axilinear charge arrays could also be used in a situation where hit to kill is difficult or impossible with single charge warheads, and the wide array pattern of very high speed jets covers a large area and is more destructive than single warhead charges to aircraft, incoming missile, satellite, ship or ground vehicle. The spread pattern can be set by modifying the collapse plane 1108A-1108H angle of each Axilinear shaped charge 1105A-1105H component with the longitudinal axis 1112 of the array.

With the advent of a super caliber hole in a target of interest one can produce a very deep hole into an infinite thickness target by having a repetitive series of charges and or arrays of charges delivered to the bottom of the hole made by the first charges, deepening the hole and continued by succeeding charges. In oil well stimulation, this process and capability can fracture formations for many meters outside of the casing without the need for hydraulic fracturing.

Usually in the field of shaped charge development the liner is the primary item of the design, in the case of the Axilinear shaped charge this is not the case, although the liner is of the utmost importance the containment body design is a large factor of charge performance. The planer symmetric and axisymmetric shape of the Axilinear charge explosive and the containment body when deployed singularly or in an array is very important to the proper function of this multi component shaped explosive device.

The initiation timing complexity of the arrangement of the multiple Axilinear shaped charge devices 1105A-1105H in array 1100 has a precision initiation device that ignites each separate Axilinear device in the array, simultaneously or at prescribed times. The Axilinear charge devices 1105A-1105H in array 1100 can use single or multiple detonators that initiates a multi-purpose peripheral initiator which in turn initiates the aft end of the high explosive billet 1115A-1115H of each device in the array within micro-seconds of each other. Each device 1105A-1105H after initiation produces a combination rod and spade jet, the proximity of the symmetrical axis's of each device allows the aft flattened spade portions of the jets to combine forming a periphery jet of the shape of the arrangement of the individual devices. For very large applications a central charge or concentric rings of arrays can be used to remove any core material left behind.

The configuration shown in FIGS. 17-20 of the Axilinear device produces a full periphery of jet material that is approximately two thirds the diameter of the outer diameter or periphery of the shaped charge array and will produce a full hole in the target. Axilinear arrays can contain other numbers, sizes and quantities devices, can be arranged into many geometrical configurations including circular, polygonal and splined that will produce forward rod jets and aft spade jets in close proximity to each other that will merge together at the aft flattened spade portions of the jets. The distance between each device 1105A-1105H in the array can also be aligned close enough to allow the spade portion of the jets to remove the target material between each perforation.

Figure 23:
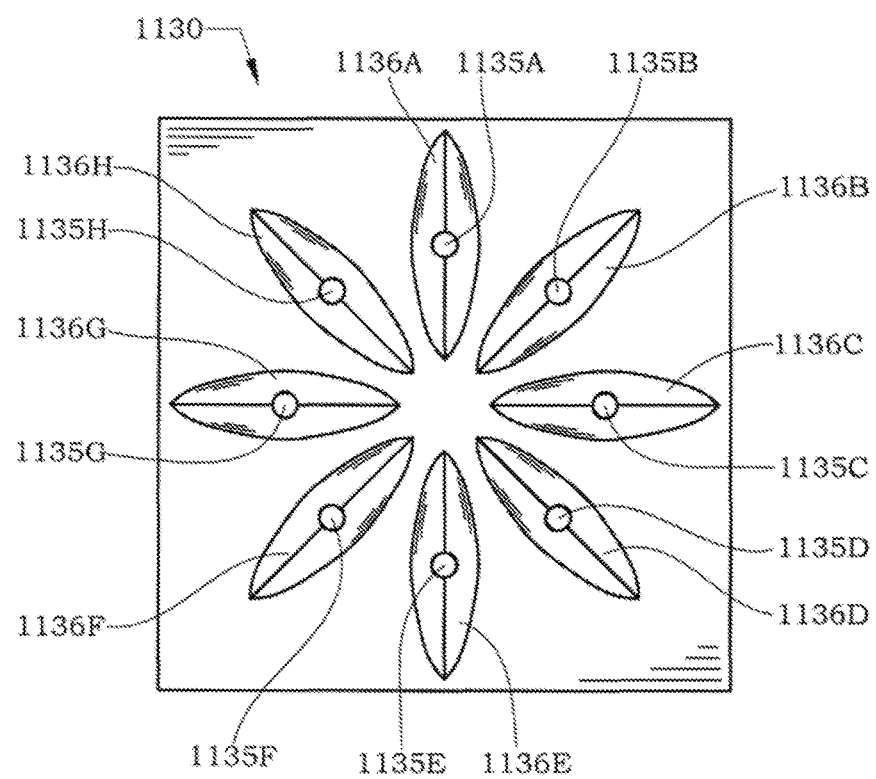
FIG. 23 is an illustrated view of a target surface with a radial extended pattern of cavities created by the detonation and the resultant jetting of the embodiment shown in FIG. 21.

Many geometrical jet stream (explosive) patterns other than circular (e.g. polygonal and splined) can be achieved by changing the Axilinear device collapse plane 1108A-1108H alignment, spacing and angles. For instance, in another alternative embodiment, FIG. 21-23 show a circular Axilinear device array 1101 that can be used with the SFGS assembly 100 and having eight individual Axilinear shaped charge devices 1105A-1105H held together by a rigid retaining structure 1110 around the array axis of symmetry 1112. Each individual Axilinear shaped charge device 1105A-1105H in FIGS. 21-23 can be, and are, configured in the manner described above with respect to the embodiments shown, including all components, configurations, and possible modifications and variations thereof. Namely, each shaped charge device is configured in a manner where each shaped charge means an explosive device, having a shaped liner, driven by a similarly shaped mating explosive billet, having an initiation device, the necessary containment, confinement and retention of the liner to the explosive billet. The result of detonation of this device is a high speed stream of material produced from the convergence of the liner driven by the explosive. This is commonly known as the Munroe Effect. The shape and size of this stream of material commonly called a jet, is dependent on the starting shape and size of the liner and explosive billet.

The Axilinear liner in each shape charge device (e.g. 1105A) in the present invention consists of two sections, aft section "B", and forward section "C". The aft section "B" is a full circumference of one of, or combination of the liner profiles, shown in the figure section of this document. This section B produces an axisymmetric rod like stretching jet with length proportional to the length of the liner section, the stretch rate, and time of flight of the jet.

The forward section "C" in each shape charge device (e.g. 1105A) consists of less than full circumference walls extending beyond the end of section B, these wing extensions are symmetrically one hundred eighty degrees apart. These wing extensions have axisymmetric cavity as viewed from inside the hollow liner form, this cavity functions to provide the convergence and work into the liner material to cause it to rise in temperature and ductility causing plastic flow. The jet from section C produces a planar symmetric stretching wide non round jet which cuts a slot rather than a round hole as produced by the rod portion of the jet.

With respect to the Axilinear array 1101 of FIG. 21, this embodiment is a variation of the FIG. 17 embodiment with the Axilinear devices 1105A-1105H being rotated 90 degrees on their longitudinal axis within the rigid retaining structure 1110 while keeping their radial position about array symmetrical axis 1112. FIG. 22 is a section view along line H-H of FIG. 21 that clarifies the orientation of the Axilinear shaped charge devices 1105A-1105E and the EW liner collapse planes 1108A, E with symmetrical axis 1112 within the array of the FIG. 21 embodiment. The collapse planes 1108A and 1108E of device 1105A and 1105E are parallel to line H-H and all eight devices in this array are oriented the same relative to the symmetrical axis 1112 of the array. The FIG. 22 section view of device 1105A and 1106E shows the inside face of one wing of EW liner 1106A and 1106E and a normal view point of collapse plane 1108A and 1108E.

FIG. 23 illustrates a target 1130 that shows a circular star like pattern of eight elongated perforated slots 1136A-1136H, and the deep hole penetrations 1135A-1135H made by a circular array of eight Axilinear jets from the embodiment of FIG. 21. The orientation and direction of the elongated slots are controlled by the orientation and direction of the Axilinear device 1105A-1105H collapse planes 1108A-1108H, and match the direction as the array collapse planes shown in FIG. 21. The elongated perforated slots 1136A-1136H are created by the spade portion of the jets and at the center of each elongated slot are deep hole 1135A-1135H penetrations created by the rod portion of the array 1101 Axilinear jets. The cavities in target 1130 is what would be expected if the target material was a metal or other material with properties similar to metal, much larger slots and diameter holes with many surrounding fractures would be expected in masonry or rock like material. The slotted holes 1136A-1136H are shown in FIG. 23 separated by target material between each slot, the material between each slot could easily be removed, forming a large cavity by changing the number of charges and spacing between them and the overall diameter of the array.

The orientation of the Axilinear shaped charge devices 1105A-1105H within arrays can be rotated other than perpendicular or parallel to the radial line of the array symmetrical axis 1112. Rotating each device in the array also rotates the flattened spade portion of the jet and the resultant elongated hole made by the spade jet. Thus, rotating the devices 1105A-H in the array 1101 shown in FIG. 21 produces a rotation of the collapse planes 1108A-E an equal amount as shown in FIG. 22, which changes and controls the effect of the array jet pattern 1135A-H and 1135A-H as shown in FIG. 23. By rotating the shape charge devices 1105A-H in this manner, there are a substantial number of different target penetration patterns that can be achieved. Further, the number of array devices, the angle of inclination front to back, and orientation of the devices within the array can be adjusted and modified to produce an incredible number of different target patterns.

Figure 24:
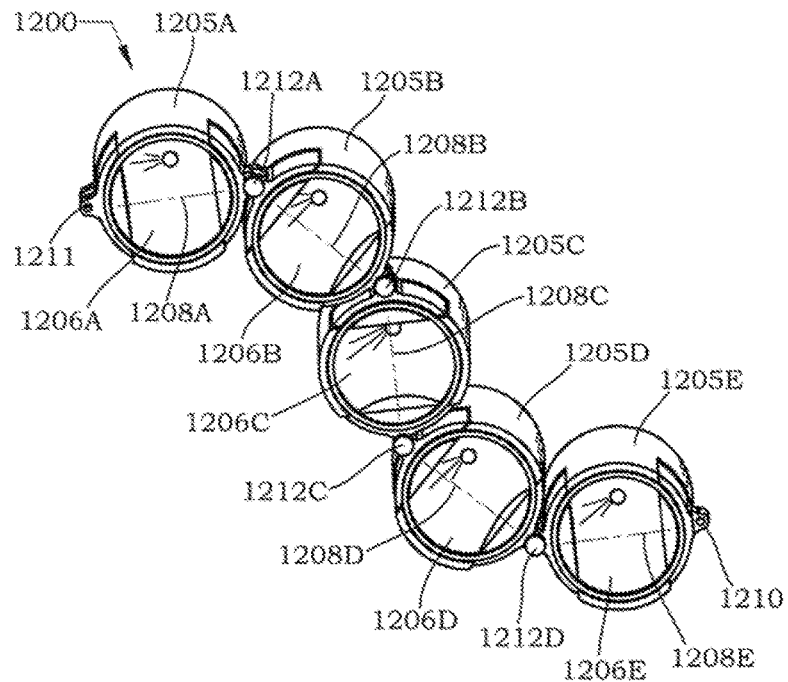
FIG. 24 is a perspective view of an articulated splined array embodiment of the invention.

With respect to the Axilinear array 1200 of FIG. 24, which can be used in the present invention SFGS assembly 100, this embodiment is a variation of the FIG. 17 embodiment with the Axilinear devices 1205A-1205E being fastened together with a clevis pin 1212A-1212D forming an articulating array 1200. The forward ends of Axilinear charges 1205A-1205E has a clevis tang 1210 on one side and on the opposite side a clevis yoke 1211 that enables the charges to be held together and articulated about the clevis pin 1212A-1212D longitudinal axis, the tang 1210 and yoke 1211 can be 180 degrees apart about the longitudinal axis of each component or any other angle for the desired application. Clevis pin 1212A-1212D could be replaced with a ball and socket joint that would add a rotational degree of freedom to rotate collapse planes 1208A-1208E in virtually any direction within the ball and socket limits.

EW liners 1206A-1206E in FIG. 24 are positioned where the wing collapse planes 1208A-1208E are coplanar with each clevis pin 1212A-1212E longitudinal axis; when an individual Axilinear component of the array is rotated about one of its clevis pins longitudinal axis the collapse plane of that component rotates an equal amount. Rotating the Axilinear charges about a pinned joint allows infinite array shapes and infinite elongated cavity shapes formed by the spade jets after detonation of the array. Articulating arrays of Axilinear shaped charges allows in the field adaptability to solve many mining and demolition applications.

Figure 25:
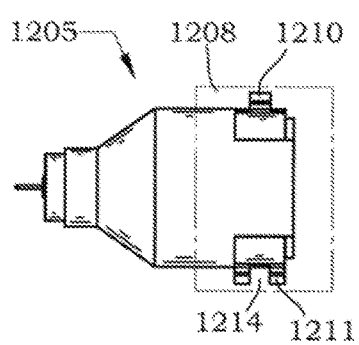
FIG. 25 is a side view of an individual shaped charge used in FIG. 24.
Figure 26:
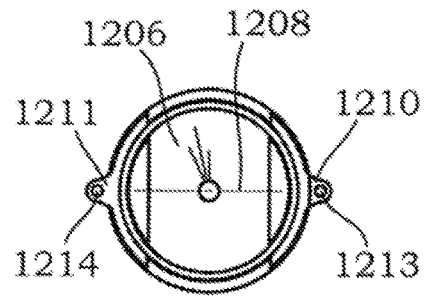
FIG. 26 is a front view of an individual shaped charge used in FIG. 24.

FIG. 25 and FIG. 26 clarify the construction of an individual Axilinear shaped charge of the FIG. 24 array 1200. Axilinear charge 1205 has a clevis tang 1210 at the forward end that has a round hole 1213 through tang 1210 and the longitudinal axis of hole 1213 being coplanar with the collapse plane 1208 of EW liner 1206. A clevis yoke 1211 at the forward end of charge 1205 with a round hole 1214 through yoke 1211 and the longitudinal axis of hole 1214 being coplanar to collapse plane 1208. Yoke 1211 is positioned on the opposite side of charge 1205 from tang 1210, being 180 degrees opposed to tang 1210.

Two Axilinear charges 1205 can be mated together by placing tang 1210 of the first charge in the center space 1214 of yoke 1211 of the second charge, aligning the holes 1213 and 1214 about their longitudinal axis and inserting a clevis pin to fasten the two charges together. When detonated the Axilinear charge 1205 forms a rod and flattened spade jet, the flattened spade portion of the jet is coplanar with collapse plane 1208. Fastening together Axilinear charges 1205 in close proximity, forming an array of charges, then detonating the charges, forming an array of jets, allows the spade portion of each charge to overlap or intersect; these overlapping jets will erode a large deep cavity in a target material that matches the geometrical shape of the array.

Any number of Axilinear components can be used, and angles between each component can be adjusted to form almost any pattern e.g. curved spline, circle, polygon or straight line, as well as adjusting the orientation rotation of the shaped charge devices 1205A-E in the array 1200. That is, any number of charges can be fastened together to form an array of almost any geometrical shape and size as required for the specific application.

The present invention uses shaped charge devices in the recovery of subsurface minerals and substances, which maximizes the development, production and capture of energy resources over traditional hydraulic fracturing (HF) techniques. The present invention and system reduces the steps in the perforating and fracturing operations of the mineral bearing formation compared to traditional methods, which reduces the operation time and costs incurred in the recovery, capture, production and delivery of energy resources. The present invention achieves those objectives by controlling the direction and distance of charge detonation around the well bore or well casing.

The present invention is a subterranean (non-hydraulic) shock fracturing system and process for fracturing oil and gas bearing formations, and the present invention delivers predetermined amounts of precisely placed explosive charges into the formation surrounding a bore hole or well casing. By precision controlling the delivery of predetermined explosive charges, the present invention makes possible a precision-controlled delivery of a measured quantity of explosive into a subterranean oil or gas bearing formation with the detonation of said explosive in order to fracture the formation in an intended and directionally controlled local vicinity.

The predetermined amounts of charges in the present invention produce large diameter deep penetrations into the formation; and, by coupling to the rock concussively fractures, the formation in the vicinity of this directionally and distance controlled explosive charge will increase permeability in a desired portion of the rock or formation strata. Secondary and tertiary charges can also be loaded and exploded using the present invention to increase the depth of the primary holes, enlarge the perforations, fracture the mineral bearing formation, and maximize the production, recovery and delivery of target resources from the formation. The ability to selectively "reshoot" lateral perforation holes into new wells (or underperforming old wells) with shaped charges using predetermined amounts of explosive will also improve formation communication, unlike current hydraulic fracturing (HF) methods or any previous efforts using large amounts of explosive.

Using the systems, techniques and methods in the present invention, operators now have the ability to enlarge perforation diameters, increase the explosive hole depths, control the direction of the explosive perforations, and increase energy recovery from the substrate formations, which greatly improves over existing hydraulic fracturing, rapid gas generation, and fracturing techniques. The present invention is a system and method of operation can be called a "Select Fire Gun System" or SFGS, which allows operators to perforate well bore casings with a series of individually contained primary shaped charge devices of predetermined explosive amounts, and then the present invention aligns and individually initiates a repeated succession of secondary and tertiary individually contained shaped charge devices in a series of common lateral formation holes in a controlled direction. The Select Fire Gun System (SFGS) is composed of multiple segments, each containing a series of individual blast and containment chambers assembled in a long cylindrical arrangement, and each successive chamber contains a shaped charge or projectile (or set of same) that can be fired at with a predetermined explosive force (amount) in a controlled direction into the formation surrounding the borehole or well casing. The present invention uses this system of segmented select-fired multi-chambered shaped charge explosions to support repeated firings into perforation holes made by previously fired charges from the same SFGS system.

An important aspect of the present invention is the locking mechanism that locks the SFGS firing mechanism in the main borehole and ratchets the SFGS mechanism down or up the borehole or well casing and rotationally around inside the borehole or well casing so as to align new charges with existing lateral holes. The locking and alignment subsystems facilitate the depth, direction and distance control of shaped charges or explosives bearing projectiles to be propelled deep into the formation through the existing holes made by primary shaped charges and detonated at or near the hole created at the location of the previous shaped charge penetration.

The present invention method and system can be repeated many times, which allows for a greater lateral distance to be reached from the borehole in a controlled depth and distance in the borehole or well casing. Fracturing along and across natural formation planes can be accomplished using the present invention, which allows for the recovery and capture of a larger volume of the energy resources in a formation surrounding a borehole through a more thorough draining of the resource bearing formation as well as minimizing the flow of fluids along natural faults in the formation. Each time a charge is detonated outside the well casing, the detonation can be coupled to the formation so that it sends a shock wave through the formation, which allows operators to also seismically measure and read the shock waves in the well bore or at many locations around the main bore hole, which in turn allows operators to more precisely analyze many items of interest and more precisely determine the varying densities surrounding the borehole.

The present invention is far more efficient, precise and controlled than traditional hydraulic fracturing (HF) techniques because the present invention controls distance of explosive force, direction of the explosive force and depth of the explosive force in the borehole or well casing. The present invention increases permeability of the formation and increasing directional control of the concussive shattering of the rock around the epicenter of the detonation of the explosive charge deposited in the formation. The present invention is a mineral bearing formation fracturing system and process that eliminates separate steps in the traditional perforating and fracturing operations and reduces the steps in the fracturing operation, which achieves the objective of increasing production and cost efficiency of the energy recovery operations.

The present invention achieves the object of maximizing production, capture and delivery of energy resources from a formation surround a borehole or well casing by delivering a predetermined measured quantity of explosive into a subterranean oil or gas bearing formation, detonating said explosive at a controlled depth and direction, and fracturing the formation in the local vicinity of a resource deposit using directional, depth, and distance controlled charge explosions. The cost of the shock stimulation of a well is estimated to be about 80% less than hydraulic fracturing, and the present invention has a lower environmental impact than hydraulic fracturing. As an added benefit, the present invention relating to shock fracturing allows operators to secure the capture of seismic readings directly from the formation of interest.

It is also possible, the inventor further claims that multiple follow on devices of the same size can be sequentially delivered into the hole, in a semi-infinite target, and their cumulative penetrations are taken advantage of, to extend this hole to extreme depths in any direction such as in oil well stimulation. Each time a charge is detonated in a hole such as oil or gas bearing formations the shock and concussion from the explosive will fracture the formation around it. Further as the high pressure gasses from the explosive dissipate a low pressure volume is created in the perforation hole inviting the formation pressure into the hole and clearing the hole surface of any debris or coating.

Shaped charge liners come in many shapes, angles and sizes, the disclosure in this patent application intends this wide variety of options (as shown in figure section) as part and parcel of the claims of this application. While the invention has been particularly shown and described with respect to preferred embodiments, it will be readily understood that minor changes in the details of the invention may be made without departing from the spirit of the invention.

The foregoing description is by way of example only, and is not intended to limit the invention. While the systems and processes have been described in detail, modifications of those detailed descriptions are within the spirit and scope of the invention. It should be understood that aspects of the systems and processes and portions of various embodiments and various features recited above and/or in the appended claims may be combined or interchanged either in whole or in part. In the foregoing descriptions of the various embodiments, those embodiments which refer to another embodiment may be appropriately combined with other embodiments.

Having described the invention, we claim:

1. A subterranean formation explosive shape charge alignment and delivery system comprising:
   a locking device coupled to a depth placement mechanism that controls the depth of the explosive charge alignment and delivery system in a borehole, said locking device having jaws expand to make a locking engagement with one or more walls of the borehole to hold the explosive shaped charge alignment and delivery system at a desired depth position in the borehole, said jaws retract to unlock the engagement of the explosive shaped charge alignment and delivery system with the one or more walls of the borehole;
   a plurality of primary segments coupled to the locking device, each of said plurality of primary segments having a plurality of blast chambers, each of said plurality of blast chambers containing an explosive shaped charge with a predetermined measure of explosives in an explosive billet and associated detonation initiation and firing controls, one or more of said explosive shaped charges being separately and independently detonated without detonating one or more of the other explosive shaped charges in the explosive shape charge alignment and delivery system, said detonation occurring without causing fratricide damage to one or more of the other explosive shaped charges or one or more other blast chambers in the explosive shape charge alignment and delivery system;
   a plurality of centralizers with one or more said centralizers being deployed between one or more of said plurality of primary segments, each of said centralizers having expansion contacts that provide engagement of the explosive shaped charge alignment and delivery system with one or more walls of the borehole to maintain the position of the blast chambers and explosive shape charges in the borehole and to provide equal and consistent standoff distance between explosive shape charge being detonated and the nearby walls of the borehole;
   a linear actuator that is coupled to one or more of said primary segments, said linear actuator capable of adjusting the position of the one or more primary segments in a longitudinal direction up or down the borehole, in a rotational direction radially inside the borehole, or in a horizontal direction side to side in the borehole; said linear actuator:
   i. being used to position one of the explosive shaped charges in a blast chamber in one of the primary segments by the depth in the borehole, rotational direction in the borehole, and angle of inclination in the borehole of the explosive shape charge or blast chamber at a first detonation creating a first explosive hole; and,
   ii. being used to re-position another one of the explosive shape charges in another blast chamber in one of the primary segments by the depth in the borehole, rotational direction in the borehole, and angle of inclination in the borehole of the explosive shape charge or blast chamber at a second detonation occurring after said first detonation, said explosive shape charge alignment and delivery system substantially aligning the second detonation in an intended and directionally controlled local vicinity of said first explosive hole created by the first detonation to sequentially and successively create a deeper explosive hole with the second detonation.

2. The subterranean formation explosive shape charge alignment and delivery system of claim 1 wherein said first or second detonations are used with seismic investigations.

3. The subterranean formation explosive shape charge alignment and delivery system of claim 1 wherein said jaws are expanded or retracted by an electric motor, hydraulic motor, hydraulic cylinder or other suitable power device.

4. The subterranean formation explosive shape charge alignment and delivery system of claim 1 wherein said linear actuator can be driven by an electric motor, hydraulic motor, hydraulic cylinder or other suitable power device.

5. The subterranean formation explosive shape charge alignment and delivery system of claim 1 wherein said one or more explosive shape charges in said blast chambers are electronically coupled to each other.

6. The subterranean formation explosive shape charge alignment and delivery system of claim 1 wherein said one or more primary segments are electronically coupled to each other.

7. The subterranean formation explosive shape charge alignment and delivery system of claim 1 wherein each of said blast chambers is capable of holding at least one explosive shape charge.

8. The subterranean formation explosive shape charge alignment and delivery system of claim 1 further comprising:
   a well casing internal to the borehole.

9. The subterranean formation explosive shape charge alignment and delivery system of claim 1 wherein said plurality of blast chambers is in the range of 1 to 20 blast chambers in one of said primary segments.

10. The subterranean formation explosive shape charge alignment and delivery system of claim 1 wherein said plurality of primary segments is between 1 to 20 primary segments.

11. The subterranean formation explosive shape charge alignment and delivery system of claim 1 wherein said primary segments are all contiguously connected to each other.

12. The subterranean formation explosive shape charge alignment and delivery system of claim 1 wherein one or more of said blast chambers is covered with a screw port cover.

13. The subterranean formation explosive shape charge alignment and delivery system of claim 1 wherein centralizer can also provide rotational movement of one or more of said primary segments.

14. The subterranean formation explosive shape charge alignment and delivery system of claim 1 wherein said explosive shape charges can include gas charges, kinetic penetrators, and self-contained shaped charges or grenades.

15. The subterranean formation explosive shape charge alignment and delivery system of claim 1 wherein said explosive shape charges can produce a super caliber hole size upon detonation.

16. The subterranean formation explosive shape charge alignment and delivery system of claim 1 wherein said first or second detonations are used with seismic investigations.

17. The subterranean formation explosive shape charge alignment and delivery system of claim 1 wherein said jaws are expanded or retracted by an electric motor, hydraulic motor, hydraulic cylinder or other suitable power device.

18. The subterranean formation explosive shape charge alignment and delivery system of claim 1 wherein said linear actuator can be driven by an electric motor, hydraulic motor, hydraulic cylinder or other suitable power device.

19. The subterranean formation explosive shape charge alignment and delivery system of claim 1 wherein said one or more explosive shape charges in said blast chambers are electronically coupled to each other.

20. The subterranean formation explosive shape charge alignment and delivery system of claim 1 wherein said one or more primary segments are electronically coupled to each other.

21. The subterranean formation explosive shape charge alignment and delivery system of claim 1 wherein each of said blast chambers is capable of holding at least one explosive shape charge.

22. The subterranean formation explosive shape charge alignment and delivery system of claim 1 further comprising:
a well casing internal to the borehole.

23. The subterranean formation explosive shape charge alignment and delivery system of claim 1 wherein said plurality of blast chambers is in the range of 1 to 20 blast chambers in one of said primary segments.

24. The subterranean formation explosive shape charge alignment and delivery system of claim 1 wherein said plurality of primary segments is between 1 to 20 primary segments.

25. The subterranean formation explosive shape charge alignment and delivery system of claim 1 wherein said primary segments are all contiguously connected to each other.

26. The subterranean formation explosive shape charge alignment and delivery system of claim 1 wherein one or more of said blast chambers is covered with a screw port cover.

27. The subterranean formation explosive shape charge alignment and delivery system of claim 1 wherein centralizer can also provide rotational movement of one or more of said primary segments.

28. The subterranean formation explosive shape charge alignment and delivery system of claim 1 wherein said explosive shape charges can include gas charges, kinetic penetrators, and self-contained shaped charges or grenades.

29. The subterranean formation explosive shape charge alignment and delivery system of claim 1 wherein said explosive shape charges can produce a super caliber hole size upon detonation.

30. The method of using the subterranean formation explosive shape charge alignment and delivery system of claim 1 wherein said first or second detonations are used with seismic investigations.

31. The method of using the subterranean formation explosive shape charge alignment and delivery system of claim 1 wherein said jaws are expanded or retracted by an electric motor, hydraulic motor, hydraulic cylinder or other suitable power device.

32. The method of using the subterranean formation explosive shape charge alignment and delivery system of claim 1 wherein said linear actuator can be driven by an electric motor, hydraulic motor, hydraulic cylinder or other suitable power device.

33. The method of using the subterranean formation explosive shape charge alignment and delivery system of claim 1 wherein said one or more explosive shape charges in said blast chambers are electronically coupled to each other.

34. The method of using the subterranean formation explosive shape charge alignment and delivery system of claim 1 wherein said one or more primary segments are electronically coupled to each other.

35. The method of using the subterranean formation explosive shape charge alignment and delivery system of claim 1 wherein each of said blast chambers is capable of holding at least one explosive shape charge.

36. The method of using the subterranean formation explosive shape charge alignment and delivery system of claim 1 further comprising the step of:
providing a well casing internal to the borehole.

37. The method of using the subterranean formation explosive shape charge alignment and delivery system of claim 1 wherein said plurality of blast chambers is in the range of 1 to 20 blast chambers in one of said primary segments.

38. The method of using the subterranean formation explosive shape charge alignment and delivery system of claim 1 wherein said plurality of primary segments is between 1 to 20 primary segments.

39. The method of using the subterranean formation explosive shape charge alignment and delivery system of claim 1 wherein said primary segments are all contiguously connected to each other.

40. The method of using the subterranean formation explosive shape charge alignment and delivery system of claim 1 wherein one or more of said blast chambers is covered with a screw port cover.

41. The method of using the subterranean formation explosive shape charge alignment and delivery system of claim 1 wherein centralizer can also provide rotational movement of one or more of said primary segments.

42. The method of using the subterranean formation explosive shape charge alignment and delivery system of claim 1 wherein said explosive shape charges can include gas charges, kinetic penetrators, and self-contained shaped charges or grenades.

43. The method of using the subterranean formation explosive shape charge alignment and delivery system of claim 1 wherein said explosive shape charges can produce a super caliber hole size upon detonation.

44. A subterranean formation explosive shape charge alignment and delivery system comprising:
a locking device coupled to a depth placement mechanism that controls the depth of the explosive charge alignment and delivery system in a borehole, said locking device having jaws expand to make a locking engagement with one or more walls of the borehole to hold the explosive shaped charge alignment and delivery system at a desired depth position in the borehole, said jaws retract to unlock the engagement of the explosive shaped charge alignment and delivery system with the one or more walls of the borehole;
a plurality of primary segments coupled to the locking device, each of said plurality of primary segments having a plurality of blast chambers, each of said plurality of blast chambers containing an explosive shaped charge with a predetermined measure of explosives in an explosive billet and associated detonation initiation and firing controls, one or more of said explosive shaped charges being separately and independently detonated without detonating one or more of the other explosive shaped charges in the explosive shape charge alignment and delivery system, said detonation occurring without causing fratricide damage to one or more of the other explosive shaped charges or one or more other blast chambers in the explosive shape charge alignment and delivery system;

a plurality of centralizers with one or more said centralizers being deployed between one or more of said plurality of primary segments, each of said centralizers having expansion contacts that provide engagement of the explosive shaped charge alignment and delivery system with one or more walls of the borehole to maintain the position of the blast chambers and explosive shape charges in the borehole and to provide equal and consistent standoff distance between explosive shape charge being detonated and the nearby walls of the borehole;

a linear actuator that is coupled to one or more of said primary segments, said linear actuator capable of adjusting the position of the one or more primary segments in a longitudinal direction up or down the borehole, in a rotational direction radially inside the borehole, or in a horizontal direction side to side in the borehole; said linear actuator:

i. being used to position one of the explosive shaped charges in a blast chamber in one of the primary segments by the depth in the borehole, rotational direction in the borehole, and angle of inclination in the borehole of the explosive shape charge or blast chamber at a first detonation creating a first explosive hole; and, ii. being used to re-position another one of the explosive shape charges in another blast chamber in one of the primary segments by the depth in the borehole, rotational direction in the borehole, and angle of inclination in the borehole of the explosive shape charge or blast chamber at a second detonation occurring after said first detonation, said explosive shape charge alignment and delivery system substantially aligning the second detonation in any intended and directionally controlled local vicinity to create a second explosive hole with the second detonation.

45. A method of using a subterranean formation explosive shape charge alignment and delivery system comprising:

locking the explosive shape charge alignment and delivery system in place using a locking device coupled to a depth placement mechanism that controls the depth of the explosive charge alignment and delivery system in a borehole, said locking device having jaws expand to make a locking engagement with one or more walls of the borehole to hold the explosive shaped charge alignment and delivery system at a desired depth position in the borehole, said jaws retract to unlock the engagement of the explosive shaped charge alignment and delivery system with the one or more walls of the borehole;

coupling a plurality of primary segments to the locking device, each of said plurality of primary segments having a plurality of blast chambers, each of said plurality of blast chambers containing an explosive shaped charge with a predetermined measure of explosives in an explosive billet and associated detonation initiation and firing controls, one or more of said explosive shaped charges being separately and independently detonated without detonating one or more of the other explosive shaped charges in the explosive shape charge alignment and delivery system, said detonation occurring without causing fratricide damage to one or more of the other explosive shaped charges or one or more other blast chambers in the explosive shape charge alignment and delivery system;

coupling a plurality of centralizers with one or more said centralizers being deployed between one or more of said plurality of primary segments, each of said centralizers having expansion contacts that provide engagement of the explosive shaped charge alignment and delivery system with one or more walls of the borehole to maintain the position of the blast chambers and explosive shape charges in the borehole and to provide equal and consistent standoff distance between explosive shape charge being detonated and the nearby walls of the borehole;

coupling a linear actuator to one or more of said primary segments, said linear actuator capable of adjusting the position of the one or more primary segments in a longitudinal direction up or down the borehole, in a rotational direction radially inside the borehole, or in a horizontal direction side to side in the borehole;

positioning one of the explosive shaped charges in a blast chamber in one of the primary segments by the depth in the borehole, rotational direction in the borehole, and angle of inclination in the borehole of the explosive shape charge or blast chamber at a first detonation;

creating a first explosive hole upon detonation of said explosive shape charge;

re-positioning another one of the explosive shape charges in another blast chamber in one of the primary segments by the depth in the borehole, rotational direction in the borehole, and angle of inclination in the borehole of the explosive shape charge or blast chamber at a second detonation occurring after said first detonation, said explosive shape charge alignment and delivery system substantially aligning the second detonation in an intended and directionally controlled local vicinity of said first explosive hole created by the first detonation;

creating a deeper explosive hole with the second detonation in substantial alignment with the first explosive hole.

* * * * *